(12) United States Patent
Wakitani et al.

(10) Patent No.: US 7,100,312 B2
(45) Date of Patent: Sep. 5, 2006

(54) WORKING MACHINE

(75) Inventors: Tsutomu Wakitani, Wako (JP); Norikazu Shimizu, Wako (JP); Toshiaki Kawakami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/949,933

(22) Filed: Sep. 24, 2004

(65) Prior Publication Data

US 2005/0097785 A1 May 12, 2005

(30) Foreign Application Priority Data

Oct. 28, 2003 (JP) .............................. 2003-367870

(51) Int. Cl.
*E01H 5/09* (2006.01)
(52) U.S. Cl. ...................................... 37/246
(58) Field of Classification Search ................. 37/246, 37/245, 254, 244
See application file for complete search history.

(56) References Cited

U.S. PATENT DOCUMENTS

| | | | |
|---|---|---|---|
| 6,550,161 B1* | 4/2003 | Hanafusa et al. ............. | 37/246 |
| 6,591,593 B1* | 7/2003 | Brandon et al. ............. | 56/10.6 |
| 6,705,028 B1* | 3/2004 | Hanafusa et al. ............. | 37/246 |
| 6,717,281 B1* | 4/2004 | Brandon et al. .......... | 290/40 C |
| 6,756,750 B1* | 6/2004 | Wakitani et al. .............. | 318/54 |
| 6,840,341 B1* | 1/2005 | Fujikawa .................... | 180/65.2 |
| 6,856,035 B1* | 2/2005 | Brandon et al. .......... | 290/40 C |

FOREIGN PATENT DOCUMENTS

| JP | 01163304 | 6/1989 |
|---|---|---|
| JP | 01271317 | 3/2003 |

* cited by examiner

*Primary Examiner*—Victor Batson
(74) *Attorney, Agent, or Firm*—Adams & Wilks

(57) ABSTRACT

A working machine has a machine body, an engine mounted on the machine body, an electric motor mounted on the machine body, a working part driven by the engine during a working state of the working part for performing a working operation, and a transporting part driven by the electric motor for transporting the working machine during the working operation. A control part controls rotation of the electric motor by setting a speed of the engine as a reference speed at a time at which the working state of the working part is initiated, determining a correction coefficient corresponding to a present speed of the engine from a correction characteristic having a correction coefficient corresponding to the reference speed of the engine, determining an acceleration of the transporting part in accordance with an actual travel speed of the transporting part, obtaining a corrected acceleration by multiplying the acceleration determined by the second determining means by the correction coefficient determined by the first determining means, and accelerating the speed of the electric motor in accordance with the obtained corrected acceleration.

18 Claims, 14 Drawing Sheets

WORKING MACHINE

FIELD OF THE INVENTION

The present invention relates generally to a working machines and, more specifically, to a working machine such as a snow remover having a working apparatus, a transporting apparatus, an engine as the drive source for the working apparatus, and an electric motor as the drive source for the transporting apparatus.

BACKGROUND OF THE INVENTION

Common working machines having both a working part and a transporting part driven by an engine appear for example in JP-A-1-163304 and JP-UM-A-3-32617.

However, there are working machines in which the drive sources of the working part and the transporting part are separate. For example working machines having a working part driven by an engine and a transporting part driven by an electric motor appear in JP-B-53-5210 and JP-A-2001-271317. If the working part is drive-controlled with an electric motor like this, there is the advantage that the working machine can be made more maneuverable.

As an example of a working machine having the drive sources of its working part and its transporting part separate, the working machine disclosed in JP-A-2001-271317 will now be described in outline on the basis of FIG. 15.

Referring to FIG. 15, this working machine 200 has on a machine body 201 a working part 204 made up of an auger 202 and a blower 203; an engine 205 for driving the working part 204; left and right transporting parts 206, 206 consisting of crawlers; left and right electric motors 207, 207 for driving these transporting parts 206, 206; a generator 209, driven by the engine 205, for supplying electrical power to a battery 208 and the electric motors 207, 207; and a control part 211 for controlling the electric motors 207, 207.

The generator 209 is driven with part of the output of the engine 205, and the electrical power obtained is supplied to the battery 208 and the left and right electric motors 207, 207. The remainder of the output of the engine 205 is allocated to driving the working part 204 via an electromagnetic clutch 212. Thus, the working machine 200 is a snow-remover of a type in which a working part 204 is driven by an engine 205 and transporting parts 206, 206 are driven by electric motors 207, 207.

Now, when the working machine 200 is only being made to move along, because all that is happening is that the transporting parts 206, 206 are being driven by the electric motors 207, 207, the load on the engine 205 is small. And even during snow-removing work with the working machine 200 traveling, when the height of the accumulated snow is low or when the snow is light in quality, the load on the engine 205 is small. In the case of a light load like this, to reduce fuel consumption and have consideration for the working environment, it is desirable to reduce the engine speed by lowering the throttle aperture.

However, during snow-removal work, the size of the load often fluctuates. For example, to deal with the light load of just making the working machine 200 travel, the engine speed is lowered to a so-called low idle state. When from this state the working part 204 is driven and snow-removing is carried out, because a working load is added to the transporting load, even if it is only a light working load, the load on the engine 205 increases. Because the engine speed falls in correspondence with this increase in load, the speed of the electric motors 207, 207 also falls. As a result, the travel speed of the working machine 200 falls and the efficiency of the snow-removal work decreases. To maintain work efficiency, it is necessary for the operator to increase the engine speed by adjusting the throttle aperture.

When it is necessary to adjust the throttle aperture like this every time the load fluctuates, controlling the working machine 200 is troublesome. On the other hand, if the throttle aperture is constantly set high to reduce the trouble of control, energy is wasted and this is therefore undesirable.

Accordingly, a working machine has been awaited with which it is possible to make control of the working machine simpler by improving the operability of the working machine and reducing the frequency with which it is necessary to adjust the throttle aperture of the engine.

SUMMARY OF THE INVENTION

The present invention provides a working machine made up of: a driving part including an engine, a generator driven by the engine, a battery chargeable by the generator, and an electric motor driveable by the generator and the battery; a working part, driven by the engine, for performing predetermined work; a work on/off switch for switching the working part between a working state and a non-operating state; a transporting part, driven by the electric motor; and a control part for controlling rotation of the electric motor on the basis of a comparison of the actual travel speed of the transporting part and a target travel speed, the control part including reference speed setting means for setting the speed of the engine as of when the working part was switched on with the work on/off switch as a reference speed; correction coefficient determining means for determining a correction coefficient corresponding to the present speed of the engine from a correction coefficient characteristic having a correction coefficient corresponding to the reference speed as an upper limit value and approaching zero as the speed of the engine decreases; required acceleration determining means for determining a required acceleration of the transporting part in correspondence with the actual travel speed of the transporting part; means for obtaining a corrected required acceleration by multiplying the required acceleration by the determined correction coefficient; and means for accelerating the speed of the electric motor in accordance with the corrected required acceleration.

Thus, in this invention, the speed of the engine as of when the working part was switched on with the work on/off switch is made a reference speed, a correction coefficient corresponding to this reference speed is made an upper limit value, a correction coefficient that approaches zero as the speed of the engine decreases is set, and a correction coefficient corresponding to the present speed of the engine is determined.

A required acceleration set in correspondence with the actual travel speed of the transporting part is multiplied by the determined correction coefficient to correct this required acceleration, and the electric motor is controlled in accordance with this corrected required acceleration.

The correction coefficient is a value that approaches 0 as the speed of the engine decreases. The upper limit value of the correction coefficient corresponds to the speed of the engine as of when the working part was turned on with the work on/off switch.

For example, the state where the engine speed has been lowered to deal with the light load of just making the working machine travel, that is, the so-called low idle state, will be considered.

The upper limit value of the correction coefficient is determined at the timing at which the working part is turned on with the work on/off switch. Because of this, the correction coefficient in the low idle state is originally high. Even if the engine speed falls somewhat in correspondence with the size of the load, the correction coefficient is kept at a high value. Consequently, even if work is started in the low idle state, the speed of the electric motor is to some extent maintained. Therefore, the shift from the low idle state to an optimal working state can be made rapidly, and the operability of the working machine improves.

Furthermore, the frequency with which it is necessary to adjust the throttle aperture when the load fluctuates can be made low, and controlling the working machine becomes simple. Also, it is not necessary to set the throttle angle constantly high in order to reduce the trouble of throttle control, and fuel consumption can be reduced.

The operator can suitably determine (1) the setting of the throttle aperture and (2) the timing at which the working part was turned on with the work on/off switch. By this means, the speed of the engine as of when the working part is turned on with the work on/off switch (the reference speed) can be set freely, and it is possible to run the working machine in a more optimal state.

Preferably, the control part of this invention is provided in advance with a plurality of correction coefficient maps having different correction coefficient characteristics, and when determining the correction coefficient selects one map from among the plurality of correction coefficient maps in correspondence with the speed of the engine as of when the working part was turned on. In this case, the speed of the electric motor can be controlled more finely and optimally.

BRIEF DESCRIPTION OF THE DRAWINGS

A preferred embodiment of the present invention will be described below in detail, by way of example only, with reference to the accompanying drawings, in which.

DETAILED DESCRIPTION OF THE PREFERRED EMBODIMENT

Figure 1:
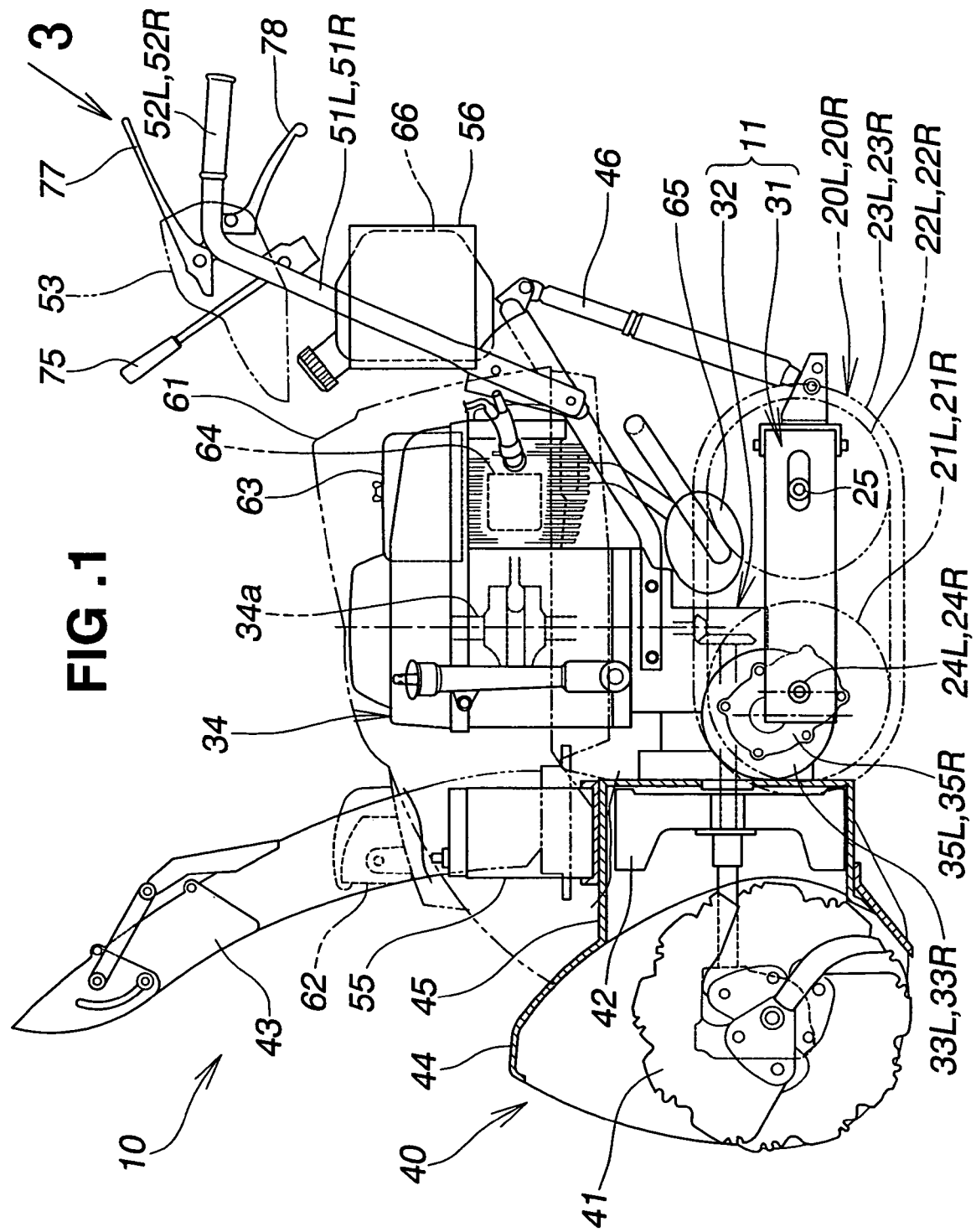
FIG. 1 is a side view of a snow-remover according to the invention.

A preferred embodiment of a working machine will now be described, and as a suitable embodiment of a working machine the example of a snow-remover will be used, as shown in the drawings.

Figure 2:
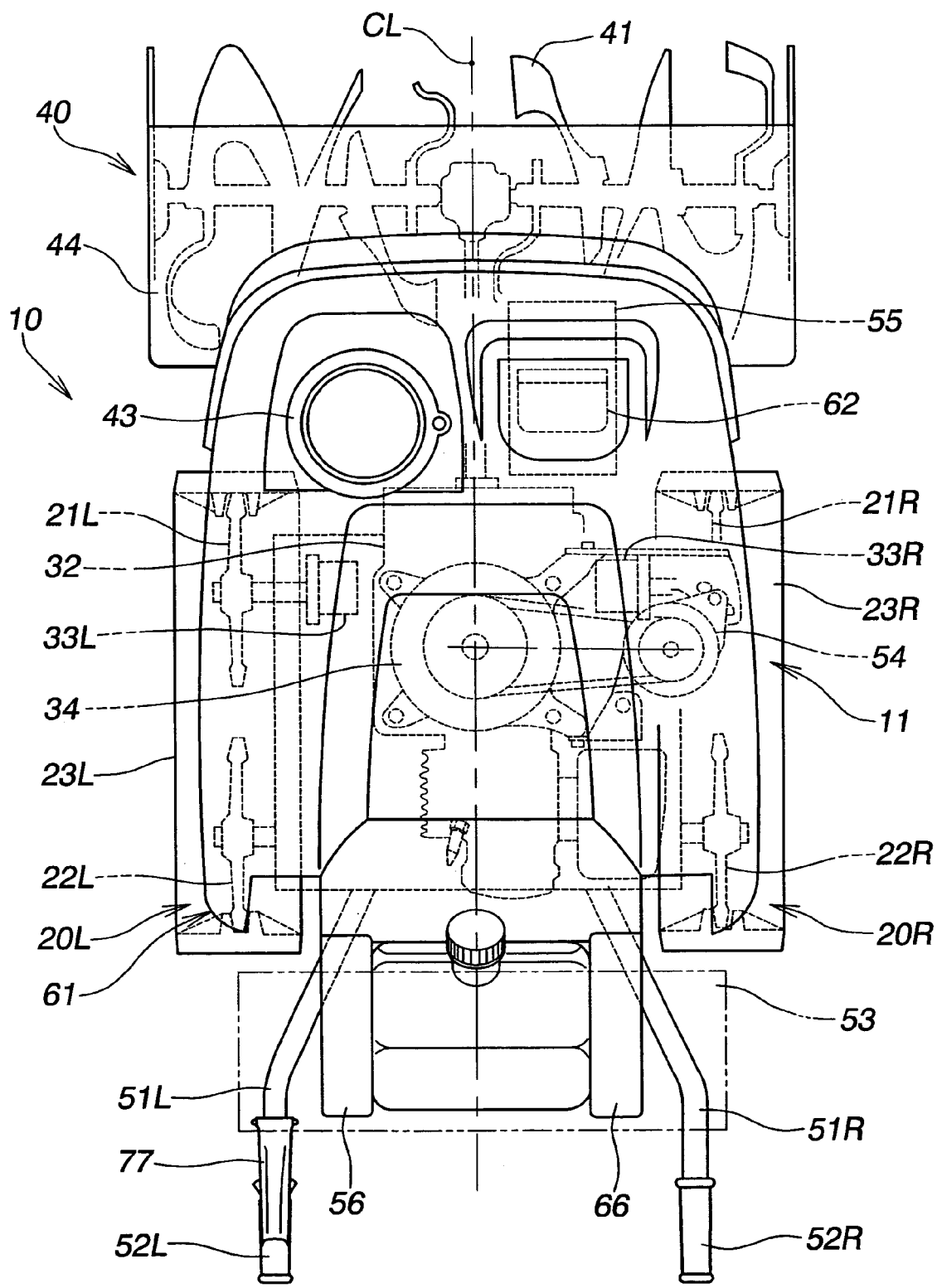
FIG. 2 is a plan view of the snow-remover shown in FIG. 1.

As shown in FIG. 1 and FIG. 2, a snow-remover 10, which is a working machine, includes a machine body 11 made up of a transport frame 31 and a transmission case 32.

The transport frame 31 has left and right transporting parts 20L, 20R. The transmission case 32 is attached to the transport frame 31 in such a way that it can swing up and down. Left and right electric motors 33L, 33R are mounted on left and right side parts of the transmission case 32. An engine (internal combustion engine) 34 is mounted on an upper part of the transmission case 32. A snow-removal working part 40 is mounted on the front of the transmission case 32. Left and right operating handles 51L, 51R extend upward and rearward from the top of the transmission case 32. A control panel 53 is provided between the left and right operating handles 51L, 51R.

The snow-remover 10 is a self-propelled, walking-type working machine whose operator walks behind the control panel 53.

The left and right operating handles 51L, 51R have grips 52L, 52R at their ends to be gripped by the operator's hands It is a characteristic feature of the snow-remover 10 of this invention that the snow-removal working part 40 is driven by the engine 34 and the transporting parts 20L, 20R are driven by the electric motors 33L, 33R. This approach is adopted on the basis of the idea that for control of travel speed, turning control and forward-reverse switching control electric motors are preferable, whereas for the working parts, which are subject to sharp load fluctuations, a more powerful internal combustion engine is appropriate.

The left and right electric motors 33L, 33R are drive sources for propulsion, for driving the left and right transporting parts 20L, 20R via left and right transport transmission mechanisms 35L, 35R.

The left transporting part 20L is a crawler having a crawler belt 23L passing around a front driving wheel 21L and a rear non-driven wheel 22L, and rotates the driving wheel 21L forward and in reverse with the left drive motor 33L.

The right transporting part 20R is a crawler having a crawler belt 23R passing around a front driving wheel 21R and a rear non-driven wheel 22R, and rotates the driving wheel 21R forward and in reverse with the right electric motor 33R.

The transport frame 31 rotatably supports left and right driving wheel axles 24L, 24R and at its rear end supports a non-driven wheel axle 25. The left and right driving wheel axles 24L, 24R are rotating shafts to which the left and right driving wheels 21L, 21R are fixed. The non-driven wheel axle 25 has the left and right non-driven wheels 22L, 22R rotatably attached to it.

The engine 34 is a vertical engine having a crankshaft 34a extending downward, and is a for-working drive source for driving the snow-removal working part 40 by transmitting a driving force thereto via a for-working transmission mechanism housed in the transmission case 32.

The snow-removal working part 40 is made up of an auger 41 at the front, a blower 42 at the rear, a shooter 43 at the top, an auger housing 44 covering the auger 41, and a blower housing 45 covering the blower 42. The auger 41 has an action of collecting snow piled on the ground to the center.

The blower 42 receives this snow and blows the snow through the shooter 43 to a desired position beside the snow-remover 10.

A swing drive mechanism 46 adjusts the attitude of the auger housing 44 by swinging the transmission case 32 and the snow-removal working part 40 up and down.

As shown in FIG. 2, the machine body 11 has generator 54 and a battery 55 mounted at its front.

In this way, the snow-remover 10 has a working part 40, such as a snow-removing part, on a machine body 11; an internal combustion engine 34 for driving this working part 40; transporting parts 20L, 20R made up of crawlers and wheels; electric motors 33L, 33R for driving these transporting parts 20L, 20R; a generator 54, driven by the engine 34, for supplying electrical power to a battery 55 and the electric motors 33L, 33R; and a control part 56 for controlling the rotation of the electric motors 33L, 33R. The control part 56 is for example disposed below the control panel 53 or built into the control panel 53.

In the drawings, the reference number 61 denotes a cover covering the engine 34; 62 a lamp; 63 an air cleaner; 64 a carburetor; 65 an engine exhaust muffler; and 66 a fuel tank.

Figure 3:
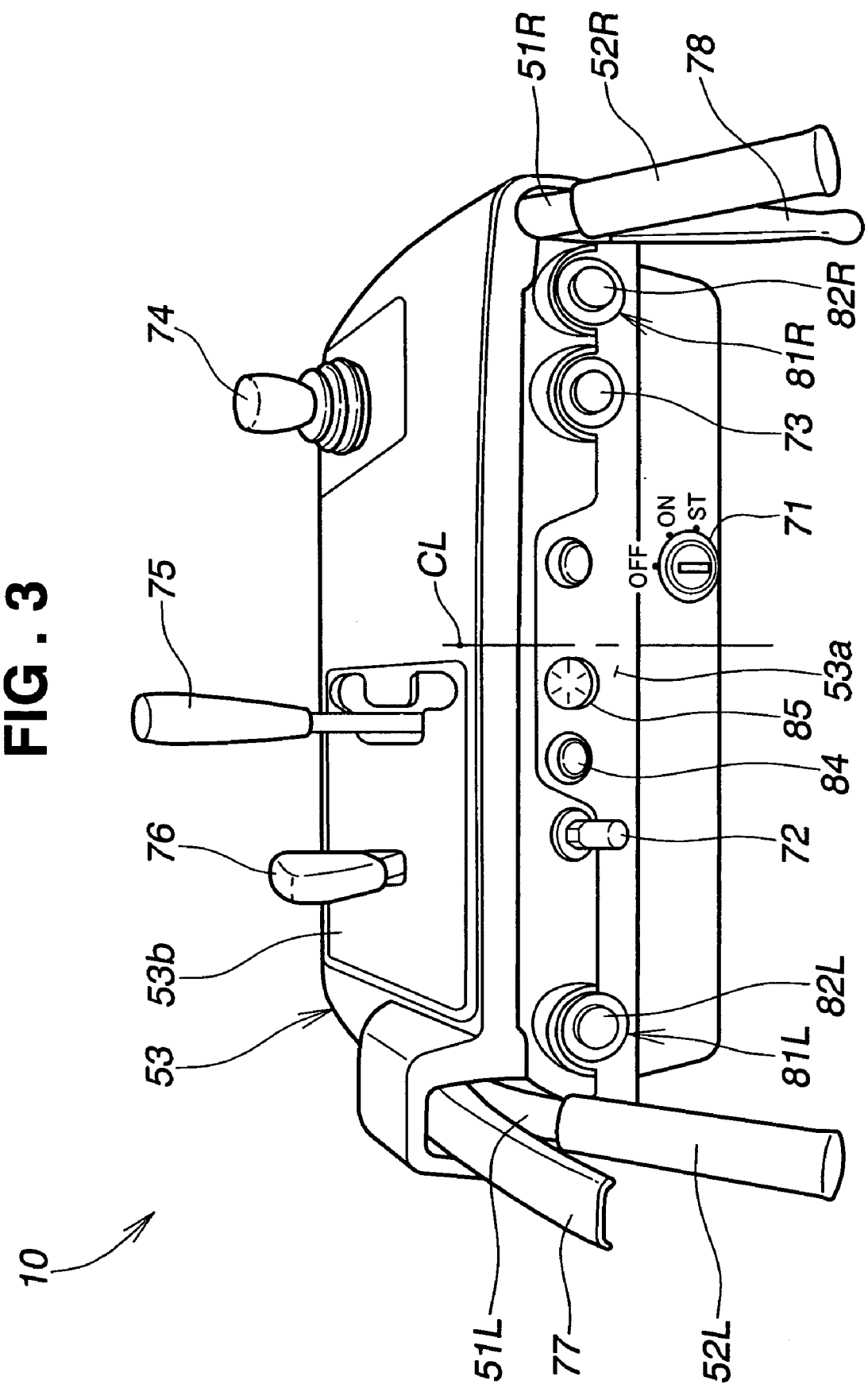
FIG. 3 is a view of a control panel seen in the direction of the arrow 3 in FIG. 1.

As shown in FIG. 3, the control panel 53 has on a rear face 53a thereof (the face on the operator side) a main switch 71, an engine switch 72 and a clutch operating switch 73. On the top face 53b of the control panel 53 are provided, in order from the right side to the left side, a snow-throwing direction adjusting lever 74, a direction/speed lever 75 serving as a direction/speed control member pertaining to the transporting part, and an engine throttle lever 76. Also, the grip 52L is disposed to the left of the control panel 53 and the grip 52R is disposed to the right of the control panel 53.

The left operating handle 51L has a travel preparation lever 77 near to the grip 52L. The right operating handle 51R has an auger housing attitude adjusting lever 78 near to the grip 52R.

Referring to FIG. 1 and FIG. 3, the main switch 71 is an ordinary ignition switch with which it is possible to start the engine 34 by inserting a main key (not shown) into a key insertion hole and turning it, and for example an 'off position OFF', an 'on position ON' and a 'start position ST' are arranged in order clockwise around the key insertion hole.

When the main key is turned to the off position OFF, the engine 34 is stopped and the entire electrical system is shut down. When the main key is turned from the off position OFF to the on position ON, the engine 34 is kept in a stopped state. When the main key is turned to the start position ST, the engine 34 is started. When the main key is turned from the start position ST to the on position ON, the started engine 34 shifts to normal running.

An engine choke 72 is a control member that raises the concentration of the fuel-air mixture when pulled. The clutch operating switch 73 is a push-button switch for turning on and off the auger 41 and the blower 42, that is, a switch for on/off-controlling the snow-removal working part 40. Hereinafter, the clutch operating switch 73 will for convenience be also referred to as 'the auger switch 73'.

The snow-throwing direction adjusting lever 74 is a lever operated to change the direction of the shooter 43.

The direction/speed lever 75 is a forward/reverse speed adjusting lever for controlling the travel speed of the electric motors 33L, 33R and switching between forward and reverse by controlling the direction of rotation of the electric motors 33L, 33R.

Figure 4:
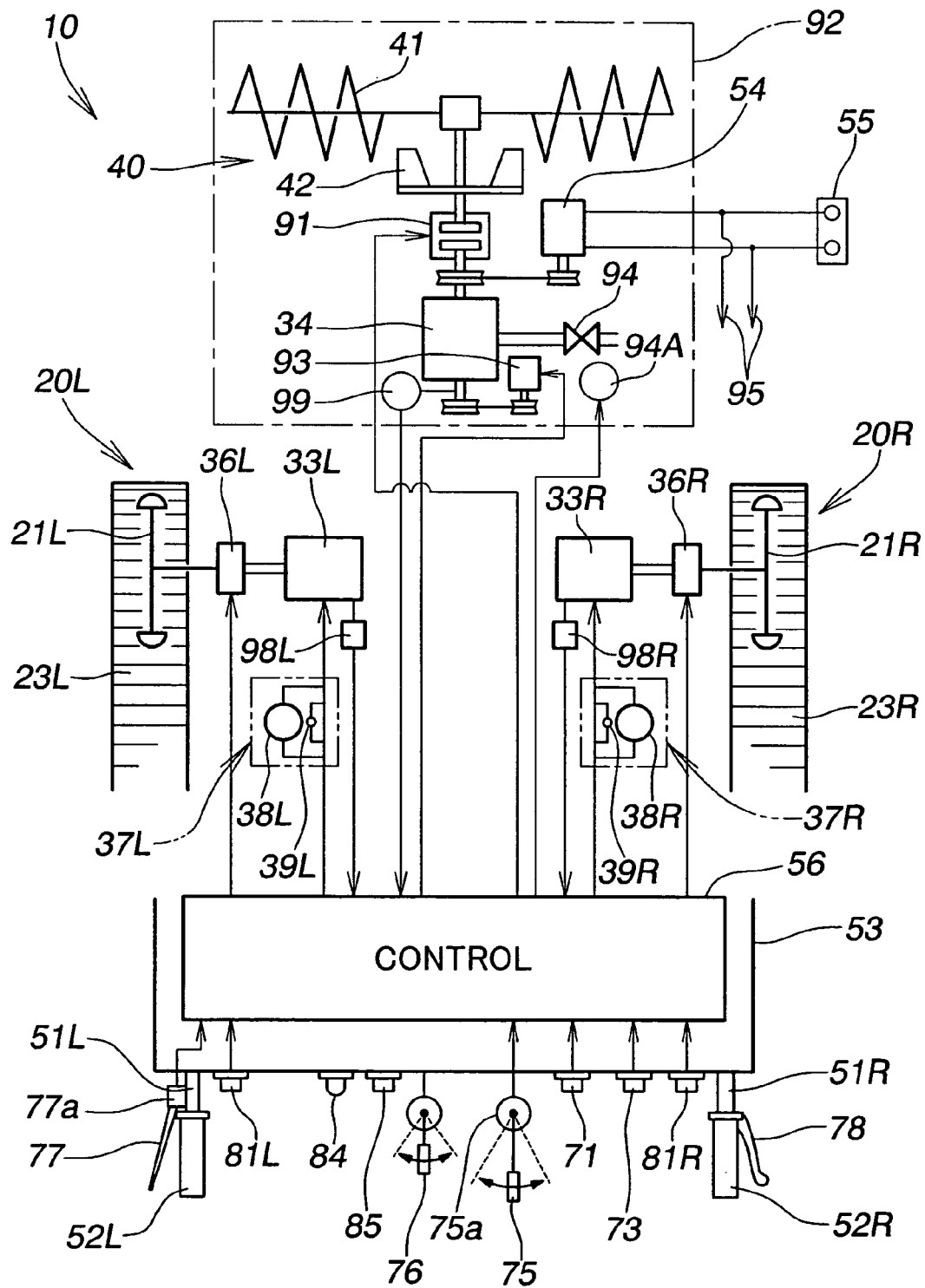
FIG. 4 is a view showing the control system of a snow-remover according to the invention.

The engine throttle lever 76 controls the speed of the engine 34 by adjusting the aperture of a throttle valve (see reference number 94 in FIG. 4).

The travel preparation lever 77 is a travel preparation member that acts on switching means (see reference numeral 77a in FIG. 4) and turns the switching means off under a pulling action of a return spring when in the free state shown in the figure. When the left hand of the operator grips the travel preparation lever 77 and moves it toward the grip 52L, the switching means turns on. In this way, the switching means detects whether or not the travel preparation lever 77 is being gripped.

The auger housing attitude adjusting lever 78 is a lever operated to control the swing drive mechanism 46 to change the attitude of the auger housing 44.

Also on the control panel 53, between the left and right operating handles 51L, 51R and located so that they can be operated by hands gripping these left and right operating handles 51L, 51R, left and right turn control switches 81L, 81R are provided.

The left turn control switch 81L consists of a push-button switch and has a push-button 82L facing rearward (toward the operator) from the snow-remover 10. This left turn control switch 81L is an automatically returning contact switch that switches on and produces a switch signal only as long as the push-button 82L is being pressed.

The right turn control switch 81R consists of a push-button switch and has a push-button 82R facing rearward (toward the operator) from the snow-remover 10. This right turn control switch 81R is an automatically returning contact switch that switches on and produces a switch signal only as long as the push-button 82R is being pressed.

Specifically, of the rear face 53a of the control panel 53, the left turn control switch 81L and its push-button 82L are disposed near the left grip 52L in a position on the machine width center CL side thereof. And of the rear face 53a of the control panel 53, the right turn control switch 81R and its push-button 82R are disposed near the right grip 52R and in a position on the machine width center CL side thereof When the operator grips the left and right operating handles 51L, 51R with both hands, the thumbs of both hands are positioned between the left and right operating handle, that is, are on the inner sides (the machine width center sides) of the operating handles 51L, 51R.

When while gripping the left and right operating handles 51L, 51R with both hands and steering the snow-remover 10 the operator extends the thumb of the left hand and pushes the push-button 82L of the left turn control switch 81L while still gripping the operating handles 51L, 51R, for as long as the push-button 82L is pressed the snow-remover 10 turns to the left. And for as long as the operator extends the thumb of the right hand and presses the push-button 82R of the right turn control switch 81R, the snow-remover 10 turns to the right.

In this way, without removing the hands from the left and right operating handles 51L, 51R, it is possible to perform a turning maneuver extremely easily with a small operating force.

Because the left and right turn control switches 81L, 81R, which operate regenerative braking circuits (see reference numerals 38L, 38R of FIG. 4) serving as turning mechanisms, are provided between the left and right operating handles 51L, 51R on the control panel 53 and located so that they can be operated by hands gripping these left and right operating handles 51L, 51R, while gripping the left and right operating handles 51L, 51R with both hands and steering the snow-remover 10 (see FIG. 1) the operator can also operate the left and right turn control switches 81L, 81R with thumbs still gripping the operating handles 51L, 51R. Accordingly, it is not necessary to swap grips of the operating handles 51L, 51R or to remove the hands HL, HR from the operating handles 51L, 51R each time the snow-remover 10 is left-turned or right-turned. Consequently, the steerability of the snow-remover 10 increases.

Also, an information display 84 and a sounder 85 serving as annunciators are further provided on the rear face 53a of the control panel 53.

The information display 84 is a part for displaying information on the basis of a command signal from the control part 56, and for example consists of a liquid crystal display panel or display lights. The sounder 85 is a part for producing a sound on the basis of a command signal from the control part 56, and for example consists of a buzzer for producing a report sound or a speech generator for producing speech.

FIG. 4 is a control diagram of a snow-remover according to the invention. The engine 34, an electromagnetic clutch 91, the auger 41 and the blower 42 constitute a working part system 92, and the rest constitutes a transporting part system.

First, the operation of the snow-removal working part 40 will be described.

When the key is inserted into the main switch 71 and turned to the sta72rt position ST shown in FIG. 3, a cell motor (starter) 93 turns and the engine 34 starts.

The engine throttle lever 76 adjusts the aperture of a throttle valve 94 by way of a throttle wire (not shown), and thereby controls the speed of the engine 34.

Also, the throttle aperture of the throttle valve 94 is automatically controlled by way of a valve driving part 94A in accordance with a control signal from the control part 56. In the throttle valve 94, the aperture control of the valve driving part 94A takes priority over aperture control with the engine throttle lever 76.

Some of the output of the engine 34 rotates the generator 54, and the electrical power obtained is supplied to the battery 55 and the left and right electric motors 33L, 33R. The remainder of the output of the engine 34 drives the auger 41 and the blower 42 via the electromagnetic clutch 91. Electrical power is supplied to the left and right electric motors 33L, 33R and other electrical components from the generator 54 and the battery 55 via a harness 95.

The reference numerals 98L, 98R denote sensors for detecting the speeds (motor speeds; rotational speeds) of the left and right electric motors 33L, 33R. The reference number 99 denotes a sensor for detecting the speed (rotational speed) of the engine 34.

When the travel preparation lever 77 is gripped and the clutch operating switch 73 is operated, the electromagnetic clutch 91 is engaged and the auger 41 and the blower 42 are rotated by motive power from the engine 34. When the travel preparation lever 77 is released, or when the clutch operating switch 73 is pressed again, the electromagnetic clutch 91 disengages.

Next, the operation of the transporting parts 20L, 20R will be explained.

The snow-remover 10 of this invention has left and right electromagnetic brakes 36L, 36R which are equivalent to a vehicle parking brake. Specifically, the motor shafts of the left and right electric motors 33L, 33R are braked by the left and right electromagnetic brakes 36L, 36R. While the snow-remover 10 is parked, these electromagnetic brakes 36L, 36R are in a braking state under the control of the control part 56. The electromagnetic brakes 36L, 36R are released by the procedure explained below.

When the two conditions of the main switch 71 being in its ON position and the travel preparation lever 77 being gripped are satisfied, if the direction/speed lever 75 is switched to forward or reverse, the electromagnetic brakes 36L, 36R assume a released (non-braking; OFF) state.

Figure 5:
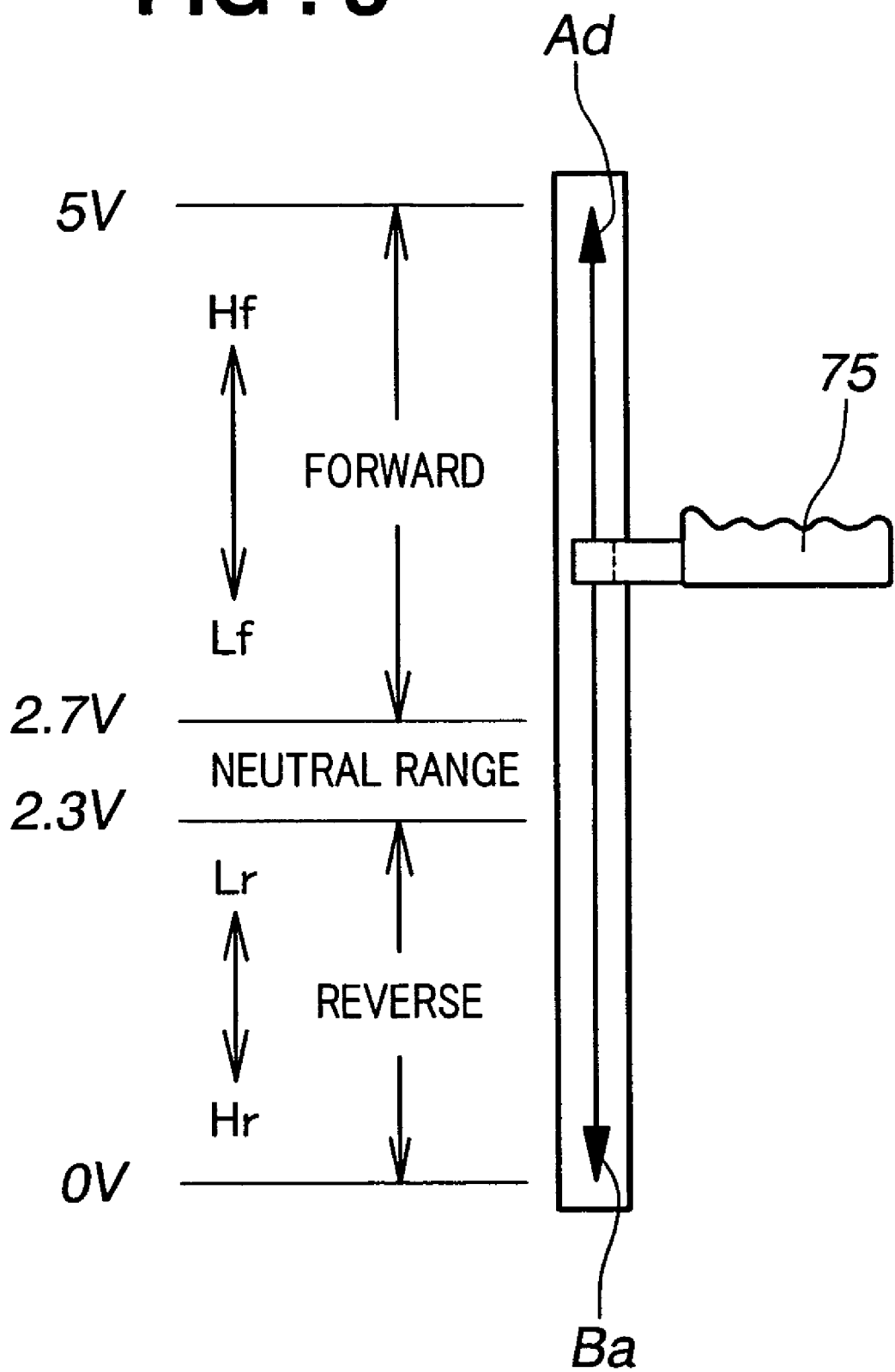
FIG. 5 is a view showing forward, reverse and neutral ranges of a direction/speed lever shown in FIG. 3.

As shown in FIG. 5, the direction/speed lever 75 can move back and forth as shown by the arrows Ad, Ba. If it is shifted from a 'neutral range' to a 'forward' side, the vehicle moves forward. In the 'forward' region, the speed can be varied so that Lf is low speed forward and Hf is high speed forward. Similarly, if it is shifted from the 'neutral range' to a 'reverse' side, the vehicle reverses. In the 'reverse' region, the speed can be varied so that Lr is low speed reverse and Hr is high speed reverse. In this preferred embodiment, by a potentiometer 75a (see FIG. 4) a voltage corresponding to the position of the direction/speed lever 75 is produced so that the maximum reverse speed is 0V, the maximum forward speed is 5V, and the neutral range is 2.3V to 2.7V, as shown on the left side of FIG. 5. In this way, with the direction/speed lever 75, it is possible to set the forward/reverse direction and perform high/low-speed speed control with a single lever.

As shown in FIG. 4, the control part 56 having obtained information on the position of the direction/speed lever 75 from the potentiometer 75a controls the left and right electric motors 33L, 33R via left and right motor drivers 37L, 37R; the speeds of the electric motors 33L, 33R are detected by rotation sensors 98L, 98R, and on the basis of those signals the control part 56 executes feedback control so that the speeds approach predetermined values. As a result, the left and right driving wheels 21L, 21R travel in a required direction at a predetermined speed.

Braking during travel is carried out by the following procedure. In this preferred embodiment the motor drivers 37L, 37R include regenerative braking circuits 38L, 38R and short-circuit braking circuits 39L, 39R serving as braking means.

When electrical energy is supplied from the battery to an electric motor, the electric motor rotates. On the other hand, a generator is means for converting rotation into electrical energy. In view of this, in this preferred embodiment, by electrical switching the electric motors 33L, 33R are changed into generators, and caused to generate electricity. If the generated voltage is higher than the battery voltage, the electrical energy can be stored in the battery 55. This is the operating principle of regenerative braking.

When the left turn control switch 81L is being pressed, on the basis of its switch ON signal the control part 56 operates the left regenerative braking circuit 38L and thereby lowers the speed of the left drive motor 33L. When the right turn control switch 81R is being pressed, on the basis of its switch ON signal the control part 56 operates the right regenerative braking circuit 38R and thereby lowers the speed of the right electric motor 33R.

That is, only when the left turn control switch 81L is being pressed the snow-remover 10 turns to the left, and only when the right turn control switch 81R is being pressed it turns to the right.

The traveling of the snow-remover 10 can be stopped by any of the following (1) to (3).

(1) Returning the main switch 71 to its OFF position.
(2) Returning the direction/speed lever 75 to its neutral position.
(3) Releasing the travel preparation lever 77.

This stopping of travel is executed using the short-circuit braking circuits 39L and 39R, after electrical speed reduction control, which will be further discussed later, is carried out.

The left short-circuit braking circuit 39L is a circuit for shorting the poles of the drive motor 33L, and this shorting causes the drive motor 33L to be braked sharply. The right short-circuit braking circuit 39R is the same.

After this stopping of travel, if the main switch 71 is returned to its OFF position, the electromagnetic brakes 36L, 36R work, with the same effect as if a parking brake had been applied.

Next, the operation of the control part 56 shown in FIG. 4 will be explained, with reference to FIG. 3 and FIG. 4, on the basis of the flow charts shown in FIG. 6 to FIG. 14. This control flow starts for example when the main switch 71 is turned ON.

First, reference will be made to FIG. 6.

Step (hereinafter abbreviated to ST) 01: Initial setting is carried out. For example a flag F is set to '1'.

ST02: Switch signals (including lever position signals) of the main switch 71, the direction/speed lever 75, the switching means 77a of the travel preparation lever 77, and the left and right turn control switches 81L, 81R are read in as input signals.

ST03: It is determined whether or not the switching means 77a of the travel preparation lever 77, i.e. the travel ready switch 77a, is ON, and if YES then processing proceeds to ST04, and if NO then processing proceeds to ST06. The determination YES is made when the travel preparation lever 77 is being gripped by a hand.

ST04: The control direction and control level Op of the direction/ speed lever 75 are read in. This control direction and control level are determined by the position of the direction/speed lever 75.

ST05: The control direction of the direction/speed lever 75 is checked, and if it is the 'neutral range' it is determined that stop control is required and processing proceeds to ST06; if it is the 'forward position' it is determined that forward travel control is required and processing proceeds to ST07; and if it is the 'reverse position' it is determined that reverse travel control is required and processing proceeds to ST08.

ST06: The electric motors 33L, 33R are stopped.

Figure 7:
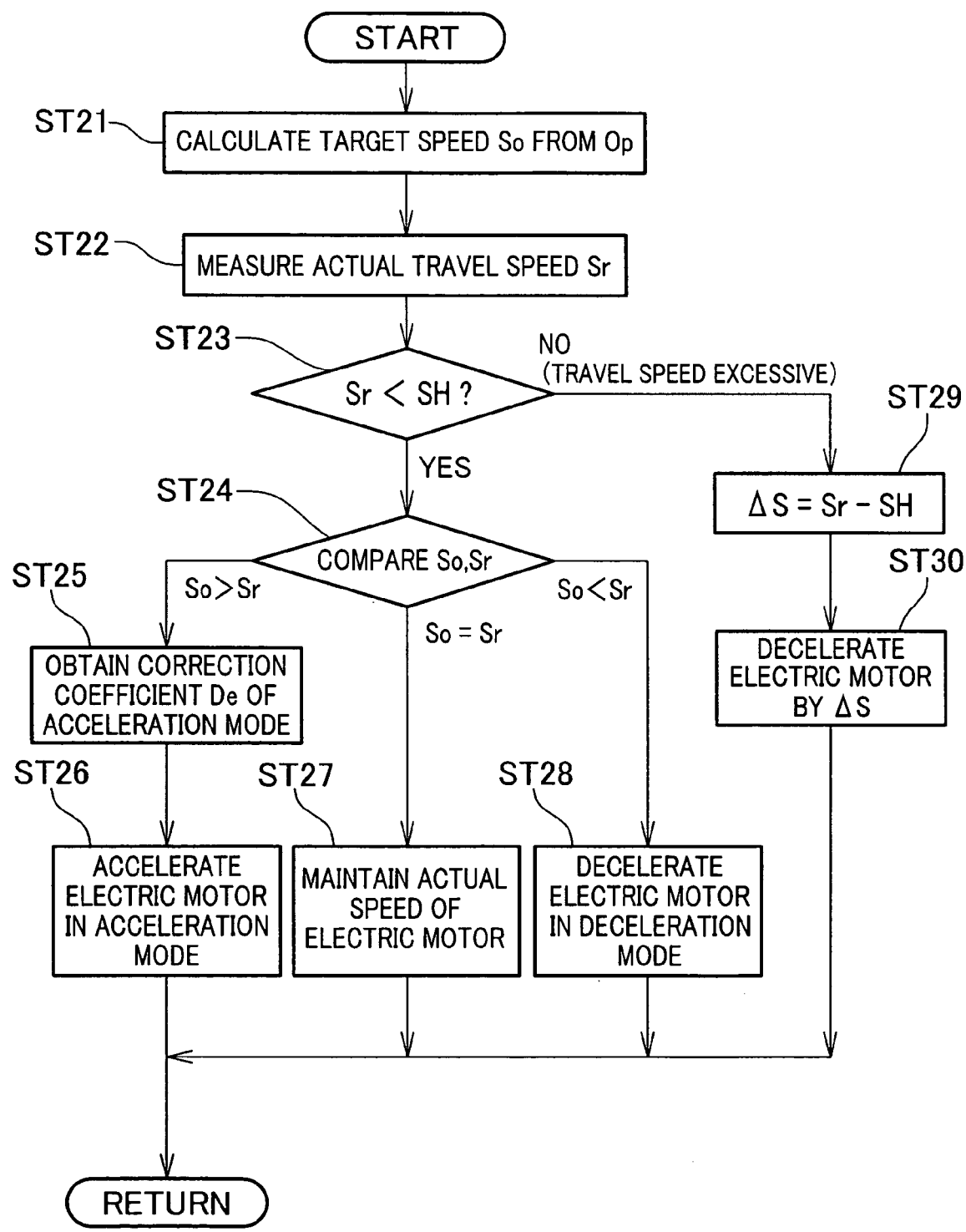
FIG. 7 is a subroutine for specifically executing forward mode control shown in ST07 of FIG. 6.

ST07: The electric motors 33L, 33R are controlled in a predetermined forward mode. A subroutine for actually executing this ST07 is shown in FIG. 7.

ST08: Reverse travel control of the electric motors 33L, 33R is carried out in a predetermined reverse mode. The control of this ST08 consists of essentially the same control steps as the forward travel control of the above-mentioned ST07, except that reverse control is executed instead of forward control.

ST09: It is determined whether or not the main switch 71 is in its 'ON position', and if YES then it is determined that this control is to be continued and processing returns to ST02, and if NO then it is determined that this control is to be ended and processing proceeds to ST10.

ST10: The electric motors 33L, 33R are stopped.

ST11: The engine 34 is stopped, and this control is ended.

Figure 6:
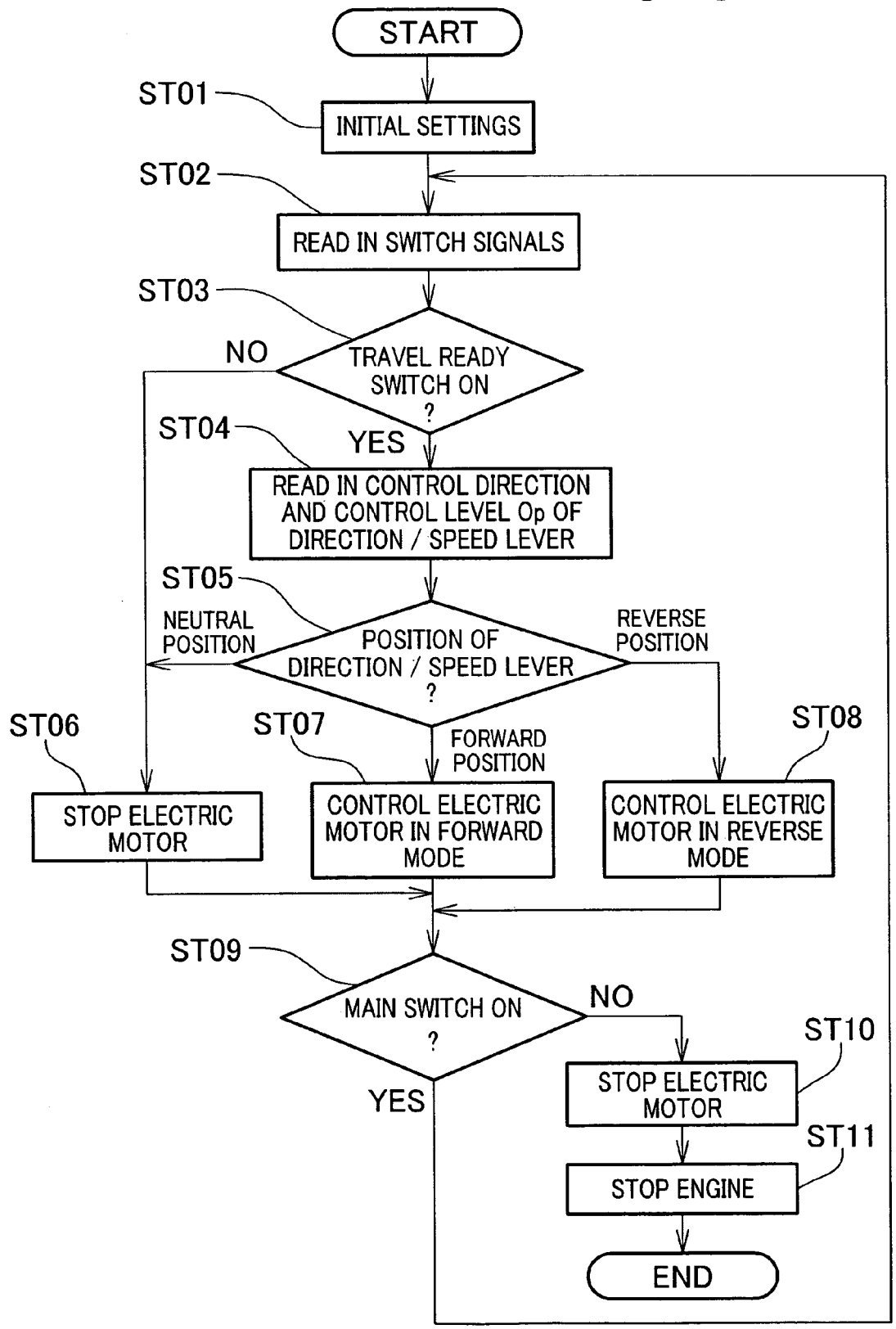
FIG. 6 is a flow chart showing travel control of an electric motor.

FIG. 7 shows a subroutine for actually executing the forward mode control shown in ST07 of FIG. 6.

ST21: From the control level Op of the direction/speed lever 75, a target speed So of the transporting part moving forward is calculated. The target speed So is for example a target motor speed of the electric motors 33L, 33R.

ST22: The actual travel speed Sr of the transporting part is obtained. The actual travel speed Sr is for example obtained by measuring the present speeds of the electric motors 33L, 33R with the rotation sensors 98L, 98R of FIG. 4.

ST23: It is determined whether or not the actual travel speed Sr is smaller than a preset upper limit threshold value SH. If YES then processing proceeds to ST24, and if NO then it is inferred that the actual travel speed Sr is too high and processing proceeds to ST29.

ST24: The target speed So and the actual travel speed Sr are compared. If the actual travel speed Sr is smaller than the target speed So, it is determined that the speed is deficient and processing proceeds to ST25. If the actual travel speed Sr is equal to the target speed So, it is determined that it is not necessary to change the state, and processing proceeds to ST27. If it is determined that the actual travel speed Sr is larger than the target speed So, it is determined that the speed is excessive and processing proceeds to ST28.

Figure 8:
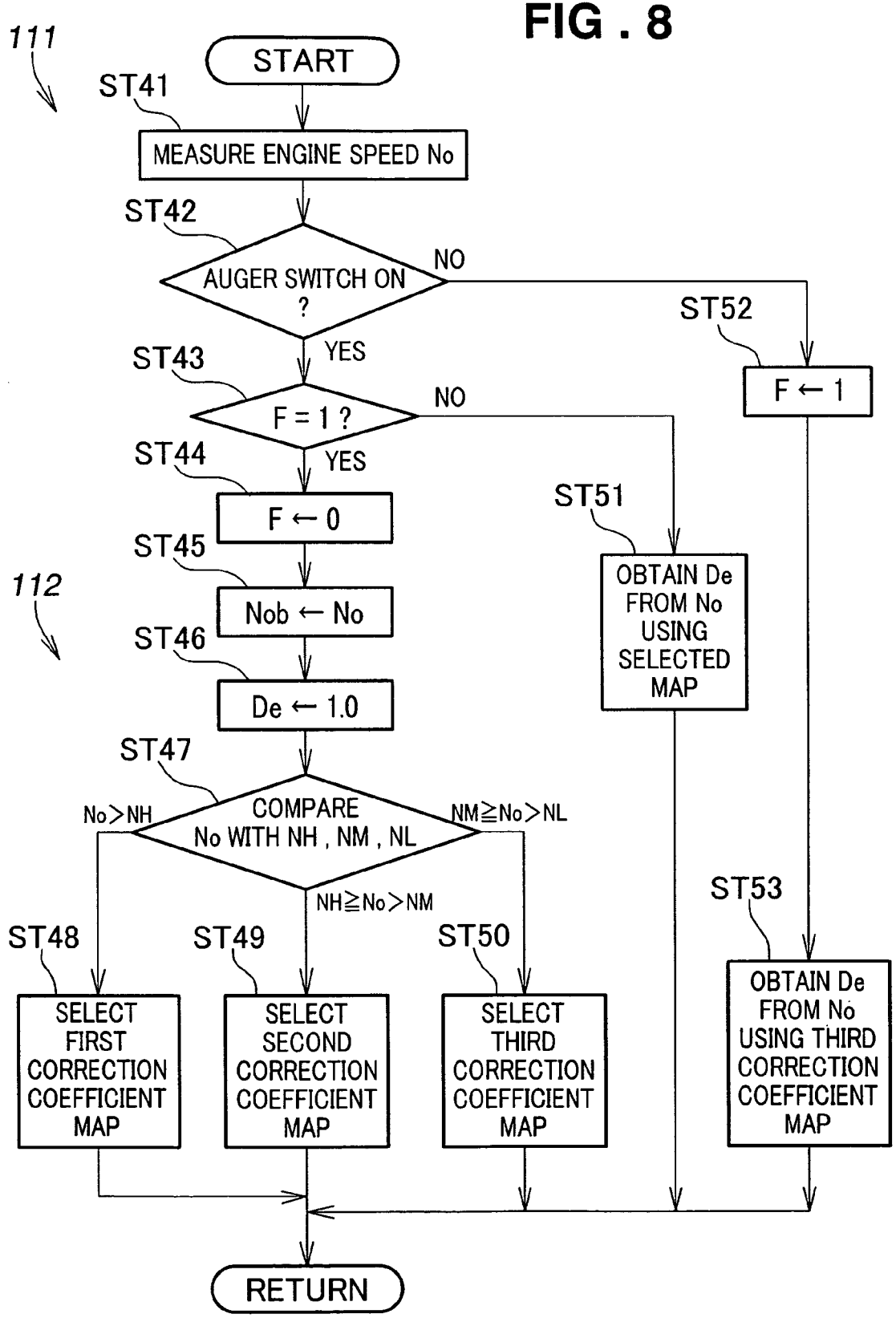
FIG. 8 is a subroutine for specifically executing a correction coefficient determination shown in ST25 of FIG. 7.

ST25: A correction coefficient De for when acceleration control of the electric motors 33L, 33R is carried out in an acceleration mode is obtained. A subroutine for actually executing this ST25 is shown in FIG. 8.

Figure 12:
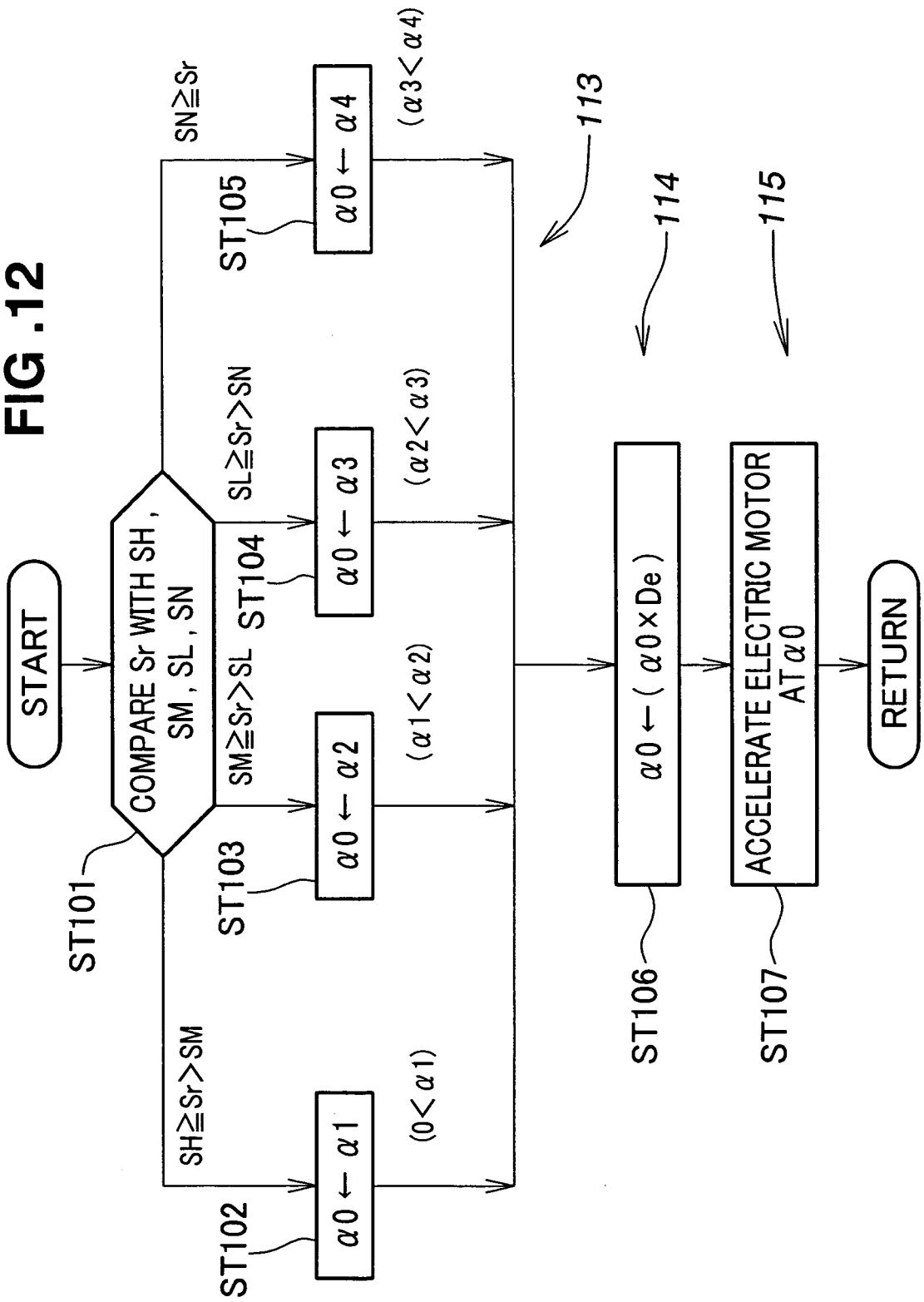
FIG. 12 is a subroutine for specifically executing acceleration mode control shown in ST26 of FIG. 7.

ST26: To correct the speed deficiency, in the acceleration mode, acceleration control of the electric motors 33L, 33R is carried out, and then the control by this subroutine is ended and processing returns to ST07 of FIG. 6. A subroutine for actually executing this ST26 is shown in FIG. 12, which will be further discussed later.

ST27: Because it is not necessary to change the state, the actual speed of the electric motors 33L, 33R is maintained, control by this subroutine is ended, and processing returns to ST07 of FIG. 6.

Figure 14:
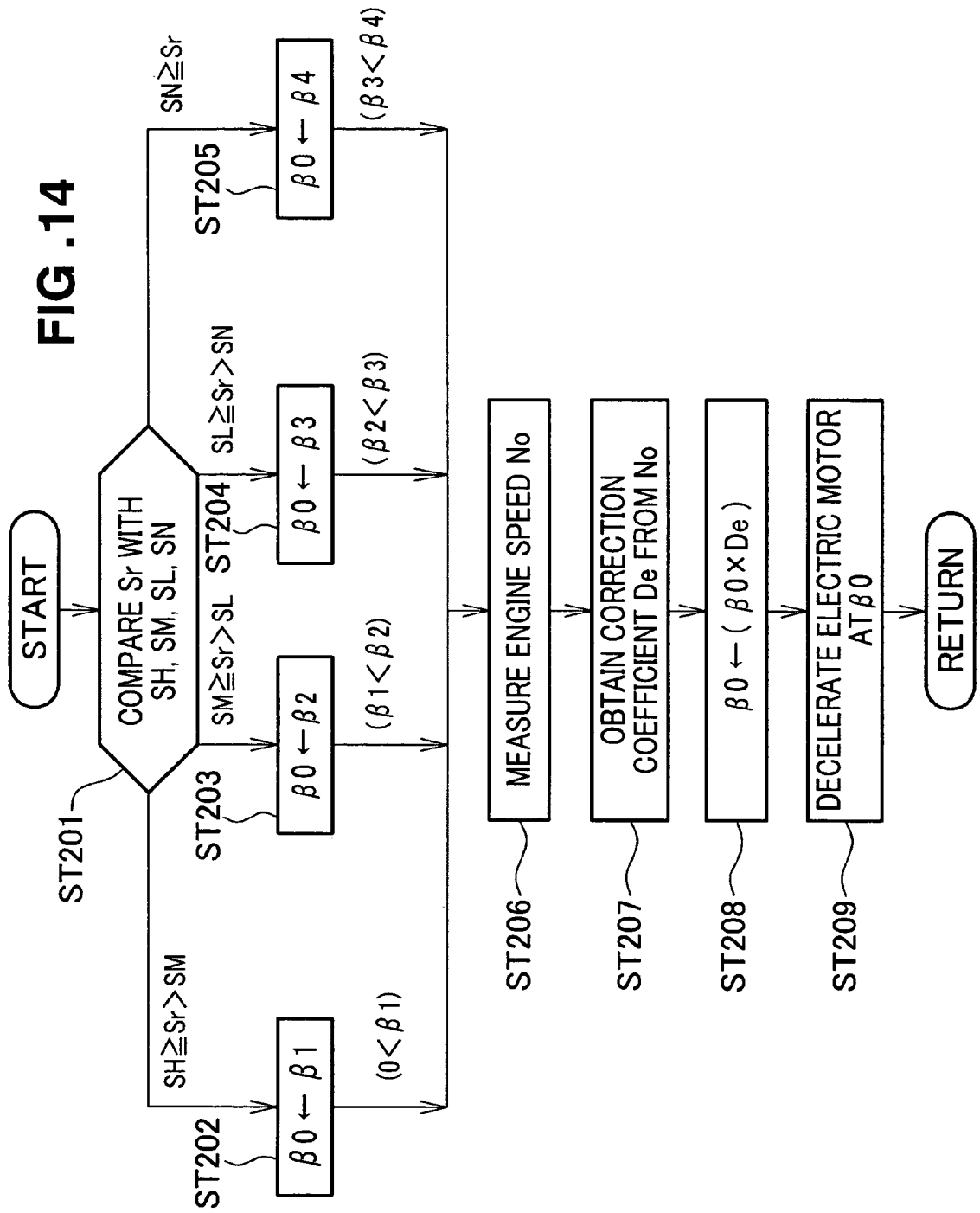
FIG. 14 is a subroutine for specifically executing deceleration mode control shown in ST28 of FIG. 7.
Figure 15:
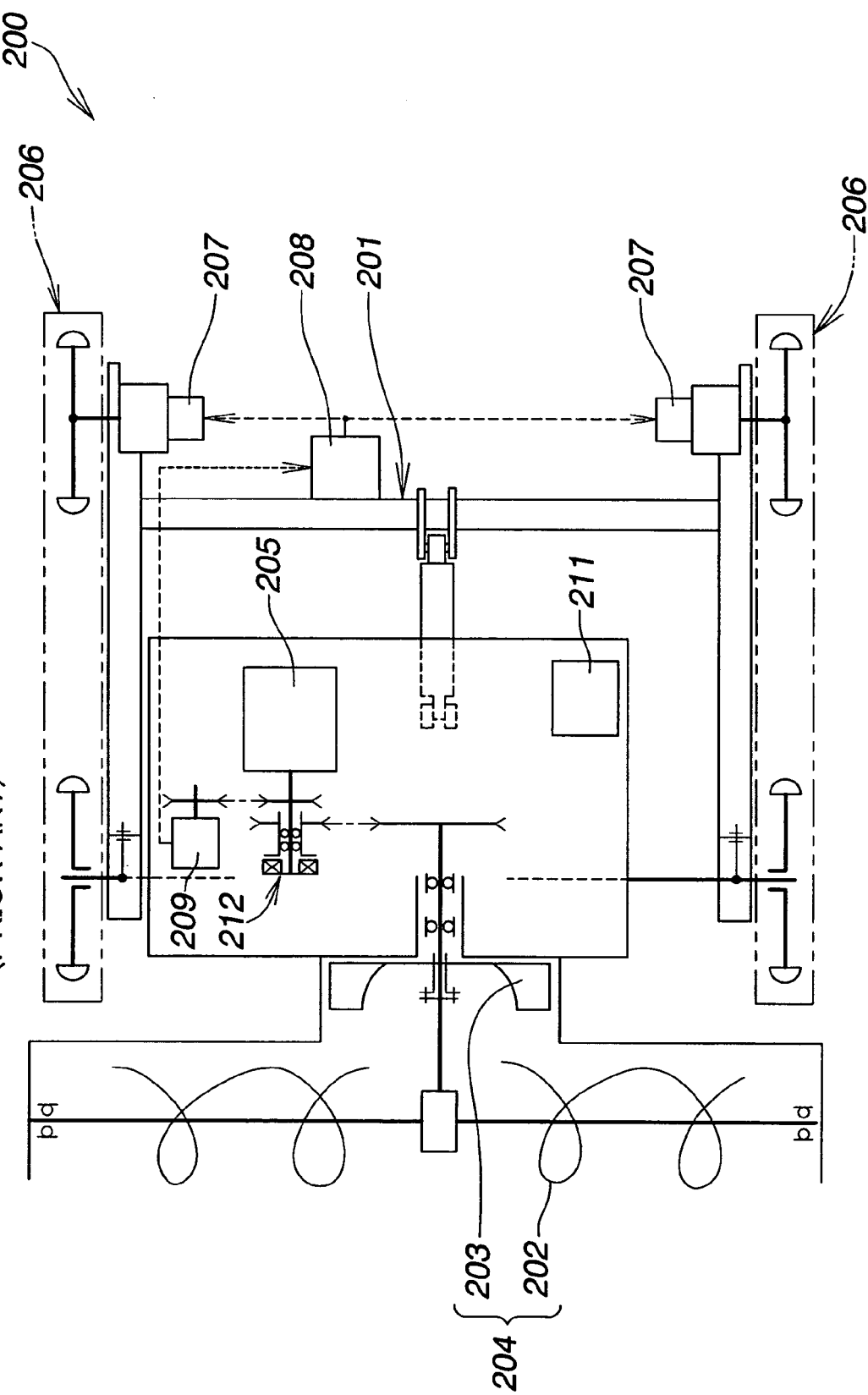
FIG. 15 is a schematic view showing a snow-remover of related art.

ST28: To correct the speed excess, in a deceleration mode, deceleration control of the electric motors 33L, 33R is carried out, and then control by this subroutine is ended and processing returns to ST07 of FIG. 6. A subroutine for actually executing this ST28 is shown in FIG. 14, which will be further discussed later.

ST29: By calculating the speed difference $\Delta S$ between the actual travel speed Sr and the upper limit threshold value SH, the amount of excess in the actual travel speed Sr is obtained.

ST30: The electric motors 33L, 33R are reduced in speed by the speed difference $\Delta S$ and thus returned to the upper limit threshold value SH, and then processing by this subroutine is ended and processing returns to ST07 of FIG. 6.

FIG. 8 shows a subroutine for actually setting the correction coefficient De of the acceleration mode shown in ST25 of FIG. 7.

ST41: The speed No of the engine 34 is obtained. The speed No can be obtained by measuring the present speed of the engine 34 with the rotation sensor 99.

ST42: It is determined whether or not the auger switch 73 (equivalent to the work on/off switch 73) is ON, and if YES then it is inferred that the working apparatus has been turned on and processing proceeds to ST43, and if NO then processing proceeds to ST52.

ST43: It is checked whether or not the flag F is '1', and if YES then it is inferred that the auger switch 73 has switched to ON and processing proceeds to ST44, and if NO then it is inferred that the ON state of the auger switch 73 is continuing and processing proceeds to ST51.

ST44: The flag F is inverted to '0'.

ST45: A reference speed Nob of the engine 34 is set to the speed No obtained in ST41. In this way, the speed No (see ST41) of the engine 34 as of when the auger switch 73 was turned from OFF to ON, that is, when the snow-removal working part 40 is turned on with the auger switch 73 (ST42 and ST43), is set to the reference speed Nob.

ST46: The correction coefficient De corresponding to the reference speed Nob is set to 1.0, which is an upper limit value.

ST47: The speed No of the engine 34 is compared with preset speed threshold values (a high speed threshold value NH, a medium speed threshold value NM and a low speed threshold value NL). These speed threshold values are in the relationship 'NH>NM>NL'. For example the high speed threshold value NH is 3000 rpm, the medium speed threshold value NM is 2500 rpm, and the low speed threshold value NL is 2000 rpm.

If the speed No is above the high speed threshold value NH, it is inferred that the speed No is in a high region and processing proceeds to ST48.

If the speed No is below the high speed threshold value NH but above the medium speed threshold value NM, it is inferred that the speed No is in a medium speed region and processing proceeds to ST49.

If the speed No is below the medium speed threshold value NM but above the low speed threshold value NL, it is inferred that the speed No is in a low speed region and processing proceeds to ST50.

Figure 9:
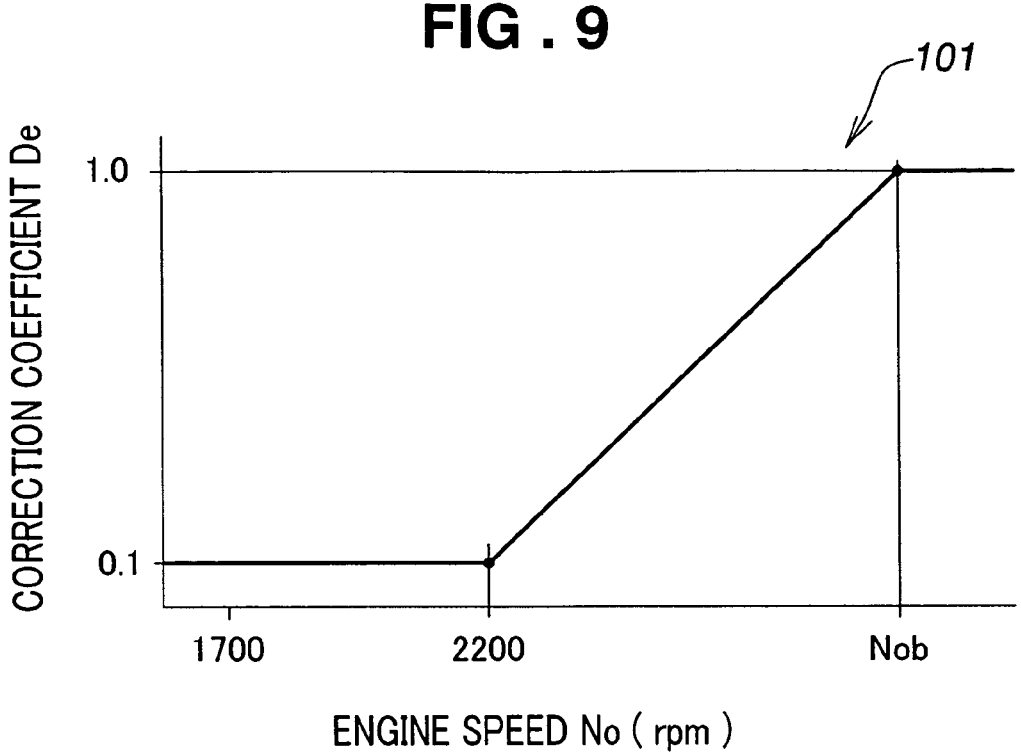
FIG. 9, FIG. 10 and FIG. 11 are first, second and third correction coefficient maps for obtaining a correction coefficient corresponding to an engine speed.

ST48: From a number of correction coefficient maps having different correction coefficient characteristics, a first correction coefficient map is selected and then processing returns to ST25 of FIG. 7. Specifically, the first correction coefficient map 101 shown in FIG. 9 is selected.

Figure 10:
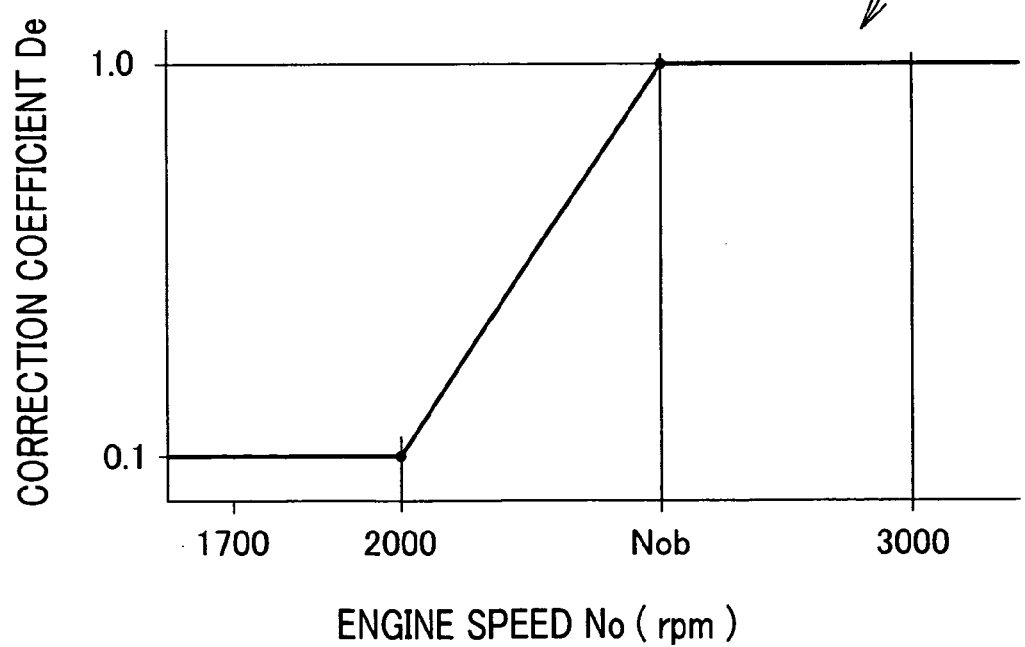

ST49: From the correction coefficient maps having different correction coefficient characteristics, a second correction coefficient map is selected and then processing returns to ST25 of FIG. 7. Specifically, the second correction coefficient map 102 shown in FIG. 10 is selected.

Figure 11:
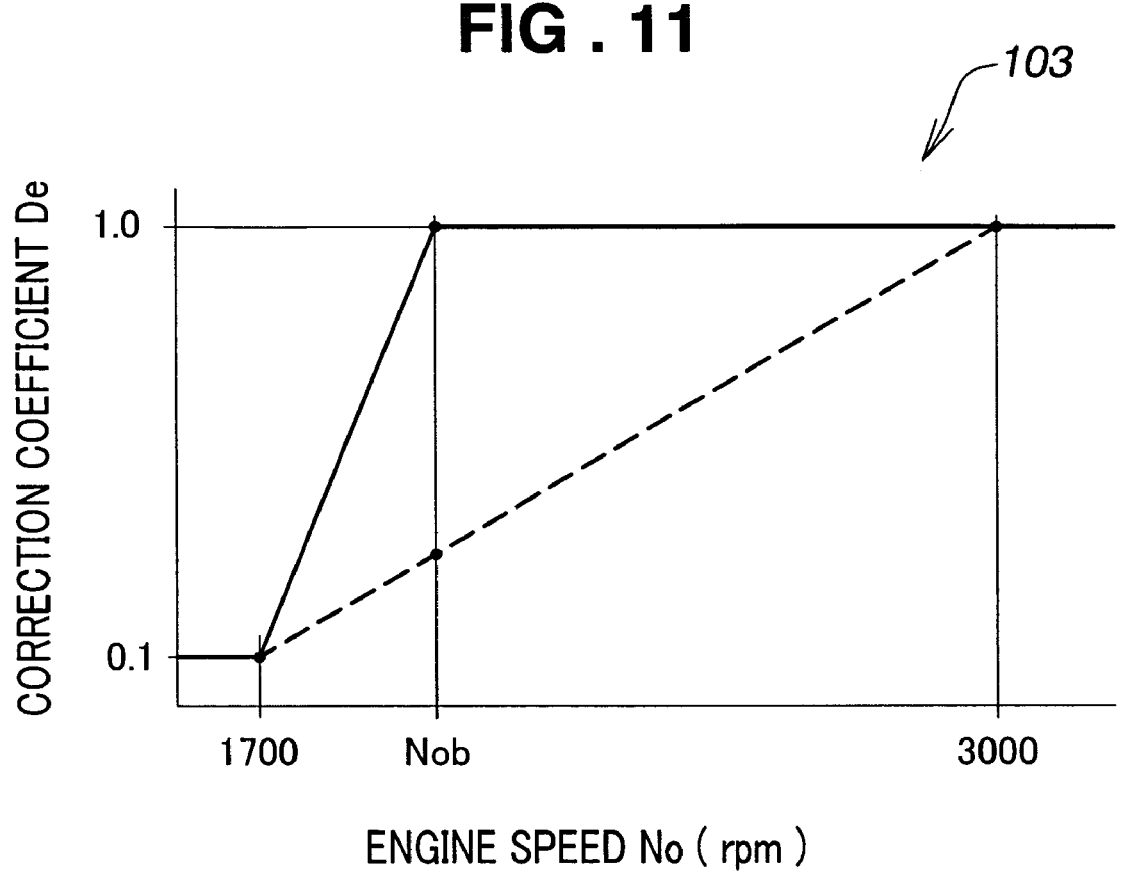

ST50: From the correction coefficient maps having different correction coefficient characteristics, a third correction coefficient map is selected and then processing returns to ST25 of FIG. 7. Specifically, the third correction coefficient map 103 shown in FIG. 11 is selected.

Here, the correction coefficient maps 101 to 103 shown in FIG. 9 to FIG. 11 will be explained.

FIG. 9 shows a first correction coefficient map 101 for obtaining a correction coefficient De corresponding to the speed No of the engine, with the speed No (rpm) of the engine on the horizontal axis and the correction coefficient De on the vertical axis.

In this first correction coefficient map 101, it can be seen that the correction coefficient De approaches 1 as the speed No of the engine increases and is a value closer to 0 the smaller is the speed No. Specifically, the correction coefficient De has a lower limit value set to 0.1 and an upper limit value set to 1.0. The lower limit value 0.1 of the correction coefficient De corresponds to a lower limit value 2200 rpm of the speed No. The upper limit value 1.0 of the correction coefficient De corresponds to the reference speed Nob. For example, when the speed No at the time when the auger switch 73 is switched on is 3300 rpm, the reference speed Nob is also 3300 rpm, and the correction coefficient De corresponding to this 3300 rpm is the upper limit value 1.0.

Accordingly, the characteristic of the first correction coefficient map 101 is as shown by the following (1) to (3). (1) When the speed No is below the lower limit value 2200 rpm, the correction coefficient De is 0.1. (2) When the speed No is above the reference speed Nob, the correction coefficient De is 1.0. (3) When the speed No is 2200 to Nob (rpm), the correction coefficient De is a value expressed by a first order straight line proportional to the speed No (rpm).

FIG. 10 shows a second correction coefficient map 102 for obtaining a correction coefficient De corresponding to the speed No of the engine, with the speed No (rpm) of the engine on the horizontal axis and the correction coefficient De on the vertical axis.

In this second correction coefficient map 102, it can be seen that the correction coefficient De approaches 1 as the speed No of the engine increases and is a value closer to 0 the smaller is the speed No. Specifically, the correction coefficient De has a lower limit value set to 0.1 and an upper limit value set to 1.0. The lower limit value 0.1 of the correction coefficient De corresponds to a lower limit value 200 rpm of the speed No. The upper limit value 1.0 of the correction coefficient De corresponds to the reference speed Nob.

Accordingly, the characteristic of the second correction coefficient map 102 is as shown by the following (1) to (3). (1) When the speed No is below the lower limit value 2000 rpm, the correction coefficient De is 0.1. (2) When the speed No is above the reference speed Nob, the correction coefficient De is 1.0. (3) When the speed No is 2000 to Nob (rpm), the correction coefficient De is a value expressed by a first order straight line proportional to the speed No (rpm).

FIG. 11 shows a third correction coefficient map 103 for obtaining a correction coefficient De corresponding to the speed No of the engine, with the speed No (rpm) of the engine on the horizontal axis and the correction coefficient De on the vertical axis.

In this third correction coefficient map 103, it can be seen that the correction coefficient De approaches 1 as the speed No of the engine increases and takes a value closer to 0 the smaller is the speed No. as shown by the solid line. Specifically, the correction coefficient De has a lower limit value set to 0.1 and an upper limit value set to 1.0. The lower limit value 0.1 of the correction coefficient De corresponds to a lower limit value 1700 rpm of the speed No. The upper limit value 1.0 of the correction coefficient De corresponds to the reference speed Nob.

Accordingly, the characteristic of the third correction coefficient map 103 is as shown by the following (1) to (3). (1) When the speed No is below the lower limit value 1700 rpm, the correction coefficient De is 0.1. (2) When the speed No is above the reference speed Nob, the correction coefficient De is 1.0. (3) When the speed No is 1700 to Nob (rpm), the correction coefficient De is a value expressed by a first order straight line proportional to the speed No (rpm).

As is clear from the foregoing description, it is a characteristic feature of the control part 56 that it is provided in advance with a plurality of preset correction coefficient maps having different correction coefficient characteristics (i.e. the first, second and third correction coefficient maps 101, 102 and 103 shown in FIG. 9 to FIG. 11).

Specifically, the control part 56 has the multiple correction coefficient maps 101 to 103 preset in built-in memory, and reads out the correction coefficient maps 101 to 103 to set a correction coefficient De in the steps of the control flow chart explained above as necessary.

In FIG. 9 to FIG. 11, to facilitate understanding, the first, second and third maps 101, 102 and 103 have been shown schematically, and the forms of the maps are not limited to these and can be set freely.

In the first, second and third maps 101 to 103, the lower limit value 0.1 of the correction coefficient De and the lower limit value of the speed No can be set freely.

Also, in ST47 of FIG. 8, the numerical values of the threshold values NH, NM and NL constituting the references for selecting the first, second and third maps 101 to 103 can be set freely.

Returning now to FIG. 8,

ST51: Because the ON state of the auger switch 73 is continuing, using the correction coefficient map 101, 102 or 103 (see FIG. 9 to FIG. 11) selected in ST47 to ST50, a correction coefficient De corresponding to the speed No of the engine 34 at the present time is obtained, and then processing returns to ST25 of FIG. 7.

ST52: The flag F is inverted to '1'.

ST53: Because the auger switch 73 is OFF, a correction coefficient De corresponding to the speed No of the engine 34 at the present time is obtained using the third correction coefficient map 103 (see FIG. 11), and then processing returns to ST25 of FIG. 7.

FIG. 12 shows a subroutine for actually executing the acceleration mode control shown in ST26 of FIG. 7.

ST101: The actual travel speed Sr is compared with preset threshold values (a high speed threshold value SH, a medium speed threshold value SM, a low speed threshold value SL and a very low speed threshold value SN). The speed threshold values are in the relationship 'SH>SM>SL>SN'. For example, the high speed threshold value (upper limit threshold value) SH=4.0 km/h, the medium speed threshold value SM=3.0 km/h, the low speed threshold value SL=1.5 km/h and the very low speed threshold value SN=0.5 km/h.

If the actual travel speed Sr is below the high speed threshold value SH and above the medium speed threshold value SM, it is inferred that the actual travel speed Sr is in a high speed range and processing proceeds to ST102. If the actual travel speed Sr is below the medium speed threshold value SM and above the low speed threshold value SL, it is inferred that the actual travel speed Sr is in a medium speed range and processing proceeds to ST103. If the actual travel speed Sr is below the low speed threshold value SL and above the very low speed threshold value SN, it is inferred that the actual travel speed Sr is in a low speed range and processing proceeds to ST104. If the actual travel speed Sr is below the very low speed threshold value SN, it is inferred that the actual travel speed Sr is in a very low speed range and processing proceeds to ST105.

ST102: An acceleration α0 needed for acceleration control of the electric motors 33L, 33R (required acceleration α0) is set to a first reference acceleration α1. The first reference acceleration α1 is for example 0.8 m/s$^2$.

ST103: The required acceleration α0 is set to a second reference acceleration α2. The second reference acceleration α2 is a value larger than the first reference acceleration α1, and is for example 0.9 m/s$^2$.

ST104: The required acceleration α0 is set to a third reference acceleration α3. The third reference acceleration α3 is a value larger than the second reference acceleration α2 and is for example 1.0 M/s$^2$.

ST105: The required acceleration α0 is set to a fourth reference acceleration α4. The fourth reference acceleration α4 is a value larger than the third reference acceleration α3 and is for example 1.4 M/s$^2$.

ST106: The required acceleration α0 is corrected by multiplication with the correction coefficient De, and this is made a new required acceleration α0. When the auger switch 73 switches from OFF to ON, the correction coefficient De set in ST46 of FIG. 8 (that is, 1.0, the upper limit value) is multiplied by the required acceleration α0.

ST107: The rotation of the electric motors 33L, 33R is acceleration-controlled with the corrected required acceleration α0, and processing returns to ST26 of FIG. 7.

Figure 13:
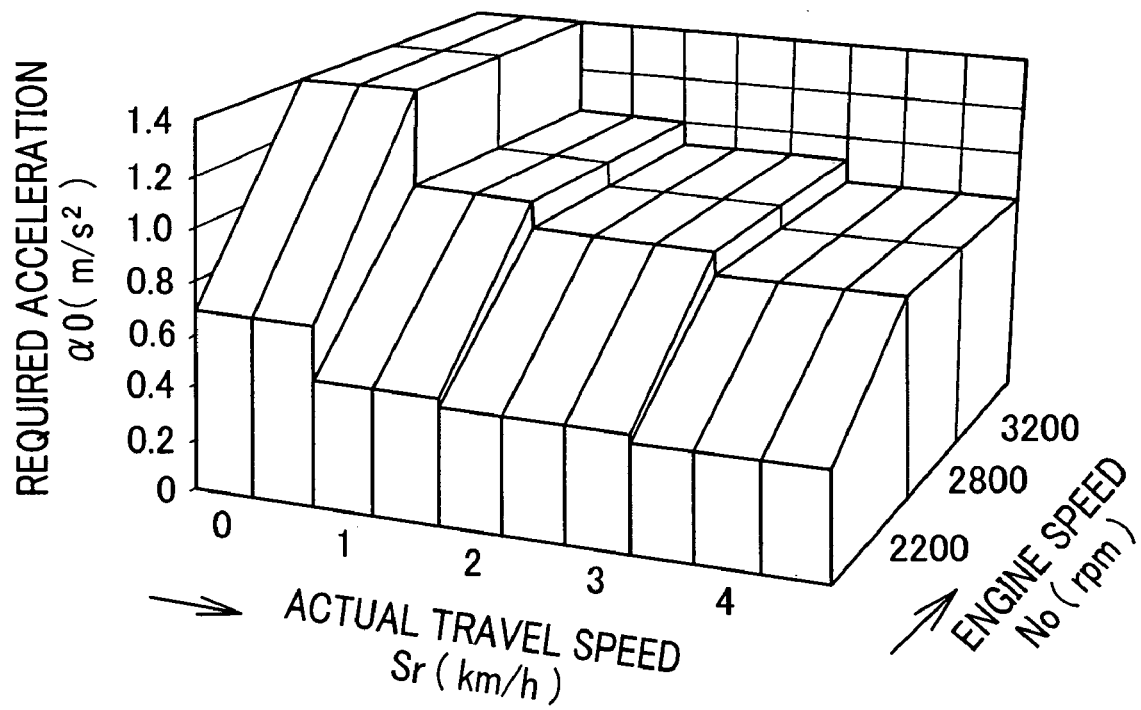
FIG. 13 is a map showing relationships between engine speed, actual travel speed and required acceleration, for obtaining a required acceleration in ST101 to ST105 of FIG. 12.

FIG. 13 is a corrected required acceleration map, and shows together the relationships between the speed No of the engine (rpm), the actual travel speed Sr (km/h) and the required acceleration α0 (m/s$^2$) executed by ST101 to ST106 of FIG. 12 when the first correction coefficient map 101 is selected in ST41 to ST48 of FIG. 8 and the correction coefficient De is obtained in ST51.

From this map it can be seen that when the speed No of the engine 34 is high, the rotation of the electric motors 33L, 33R can be accelerated at a value close to the required acceleration α0 set in correspondence with the size of the actual travel speed Sr of the transporting device. And when the speed No of the engine 34 is low, it can be seen that the rotation of the electric motors 33L, 33R can be accelerated at a small corrected required acceleration α0. Thus, the rotation of the electric motors 33L, 33R can be accelerated with an optimal required acceleration α0 corresponding to the speed No of the engine 34.

To summarize this preferred embodiment, in a snow-remover 10 in which electric motors 33L, 33R are provided as transport motors on the left and right of a machine body 11 shown in FIG. 1 and left and right driving wheels 21L, 21R (transporting part) are driven with these electric motors 33L, 33R, this snow-remover 10 has a control part 56 (see FIG. 4) for controlling the rotation of the electric motors 33L, 33R on the basis of a comparison of the actual travel speed of the driving wheels 21L, 21R with a target travel speed of the driving wheels 21L, 21R.

This control part 56 is characterized in that it has a step of setting a required acceleration α0 in correspondence with the size of the actual travel speed Sr of the driving wheels 21L, 21R (ST101 to ST105 of FIG. 12), a step of obtaining from a correction coefficient De that approaches 1 as the speed No of the engine 34 increases and approaches 0 as the speed No decreases a correction coefficient De corresponding to the speed No of the engine 34 at that time (ST51 of FIG. 8), a step of multiplying the required acceleration α0 by this correction coefficient De (ST106 of FIG. 12), and a step of controlling the rotation of the electric motors 33L, 33R with this corrected required acceleration α0 (ST107 of FIG. 12).

When an attempt is made to sharply accelerate the electric motors 33L, 33R while the engine 34 is running at a low speed, because the acceleration of the electric motors 33L, 33R is kept to an optimal value corresponding to the speed of the engine 34, the amount of electricity generated by the generator 54 (alternator) is also kept down. As a result, the load on the engine 34 is reduced. Thus it is possible to accelerate the electric motors 33L, 33R at a required acceleration while suppressing sharp load increases on the engine 34. By sharp load increases on the engine 34 being suppressed, falling of the speed of the engine 34 is prevented and it is possible to raise the working efficiency of the working part (the auger 41 and the blower 42).

FIG. 14 is a subroutine for actually executing the electric motor deceleration control shown in ST28 of FIG. 7.

The subroutine shown in FIG. 14 has basically the same content as the subroutine for acceleration-controlling the electric motors 33L, 33R in the acceleration mode shown in FIG. 12, except that a deceleration β0 is substituted for the acceleration α0. It will be described in outline below.

ST201: The actual travel speed Sr is compared with a preset high speed threshold value (upper limit value) SH, a medium speed threshold value SM, a low speed threshold value SL and a very low speed threshold value SN, and if SH≧Sr>SM then processing proceeds to ST202, if SM≧Sr>SL then processing proceeds to ST203, if SL≧Sr>SN then processing proceeds to ST204, and if SN≧Sr then processing proceeds to ST205.

ST202: A deceleration β0 (required deceleration β0) needed for deceleration-controlling the electric motors 33L, 33R is set to a first reference deceleration β1.

ST203: The required deceleration β0 is set to a second reference deceleration β2. β1<β2.

ST204: The required deceleration β0 is set to a third reference deceleration β3. β2<β3.

ST205: The required deceleration β0 is set to a fourth reference deceleration β4. β3<β4.

ST206: The speed No of the engine 34 is obtained.

ST207: In the first correction coefficient map 101 shown in FIG. 9, a correction coefficient De is obtained on the basis of the speed No of the engine 34. This is the same as ST51 of FIG. 8.

ST208: The required deceleration β0 is corrected by being multiplied by the correction coefficient De, and this is made a new required deceleration β0.

ST209: The rotation of the electric motors 33L, 33R is deceleration-controlled with the new, corrected required deceleration β0, and processing returns to ST28 of FIG. 7.

As will be clear from the foregoing description, ST201 to ST205 are steps for setting a required deceleration β0 in correspondence with the size of the actual travel speed Sr of the transporting part. ST208 is a step of multiplying the required deceleration β0 by a correction coefficient De. And ST209 is a step of controlling the rotation of the electric motors 33L, 33R with the corrected required deceleration β0.

Here, the reason for performing deceleration control of the electric motors 33L, 33R with the required deceleration β0 will be briefly explained.

Generally, when the speed of the engine 34 is low, even when the deceleration of the electric motors 33L, 33R is excessive, this does not directly increase the load on the engine 34. However, when the deceleration is excessive, the generated voltage arising as a result of the regenerative braking action of the electric motors 33L, 33R is high. Because a large generated voltage acting on the battery 55 is not good for the battery 55 and electrical parts, some sort of countermeasure is necessary. Also, when the generated voltage resulting from a regenerative braking action is excessive, it is conceivable that the rotor of the generator 54 will tend to rotate faster under this generated voltage. In this case, the generator 54 tends to rotate the output shaft of the engine 34, and this is not good for the operation of the engine 34.

With respect to this, in this preferred embodiment, the electric motors 33L, 33R are deceleration-controlled with the required deceleration β0 corrected by being multiplied by a correction coefficient De.

The required deceleration β0, like the required acceleration α0 explained with reference to FIG. 12, is set so that it becomes smaller the larger is the actual travel speed Sr and becomes smaller the smaller is the speed of the engine 34. If the required deceleration β0 is small, the generated voltage arising as a result of the regenerative braking action of the electric motors 33L, 33R is also small.

By doing this it is possible to reduce the load on the battery 55 and electrical parts and to perform deceleration control of the electric motors 33L, 33R with an optimal required deceleration β0 that is better for the operation of the engine 34.

As explained above, it is a characteristic feature of the control part 56 that it has reference speed setting means 111 which will be described below, correction coefficient determining means 112, required acceleration determining means 113, required acceleration determining means 114 and accelerating means 115.

ST41 to ST45 shown in FIG. 8 constitute reference speed setting means 111 for setting the speed No of the engine 34 as of when the snow-removal working part 40 (working part) is turned on with the auger switch 73 (work on/off switch) to the reference speed Nob.

ST46 to ST53 shown in FIG. 8 constitute correction coefficient determining means 112 for obtaining from a correction coefficient De that has its value corresponding to the reference speed Nob as an upper limit value and approaches 0 as the speed No of the engine 34 decreases a correction coefficient De corresponding to the present speed No of the engine 34.

ST101 to ST105 shown in FIG. 12 constitute required acceleration determining means 113 for setting a required acceleration α0 corresponding to the size of the actual travel speed Sr of the transporting part, i.e. the speed of the electric motors 33L, 33R.

ST106 shown in FIG. 12 constitutes required acceleration determining means 114 for correcting the required acceleration α0 to obtain a new required acceleration α0 by multiplying the required acceleration α0 by the correction coefficient De.

ST107 shown in FIG. 12 constitutes accelerating means 115 for acceleration-controlling the electric motors 33L, 33R with the corrected required acceleration α0.

Thus, in this preferred embodiment, the speed No of the engine 34 as of when the snow-removal working part 40 is turned ON with the auger switch 73 is set as a reference speed Nob, a correction coefficient De having the correction coefficient De corresponding to this reference speed Nob as an upper limit value and approaching 0 as the speed No decreases is set, and consequently a correction coefficient De corresponding to the speed No at the present time is obtained.

The correction coefficient De obtained like this is multiplied by 'a required acceleration α0 set in correspondence with the size of the actual travel speed Sr of the transporting part' to correct the required acceleration α0, and the rotation of the electric motors 33L, 33R is controlled with this corrected required acceleration α0.

The correction coefficient De is a value which is nearer to 0 the smaller is the speed No. The upper limit value of the correction coefficient De corresponds to the speed No of the engine 34 of 'when the snow-removal working part 40 is turned ON with the auger switch 73'.

For example, a state where the speed No of the engine 34 has been lowered to match a light load of just transporting the working machine 10, that is, a so-called low idle state, will be considered on the basis of FIG. 11.

In FIG. 11, the dashed line shows a comparison example of a correction coefficient characteristic. In this comparison example of a correction coefficient characteristic, the upper limit value of the correction coefficient De has been made 1.0 when the speed No is 3000 rpm, and the lower limit value of the correction coefficient De has been made 0.1 when the speed No is 1700 rpm.

In this comparison example, the state where the throttle aperture has been adjusted to lower the speed No to Nob, i.e. the low idle state, will be considered. The correction coefficient De at this time is an extremely small value of about 0.3.

In this idle state, when the snow-removal working part 40 starts to be driven, because an working load is added to the transporting load, the load acting on the engine 34 increases.

In response to the increase in load, the speed No falls. In the comparison example, in addition to the correction coefficient De in the low idle state being low in the first place, it becomes even lower in correspondence with the fall in the speed No. Because of this, when work is started in the low idle state, the rotation of the electric motors 33L, 33R also falls, and consequently the work efficiency falls.

With respect to this, in this invention, as shown with a solid line in FIG. 11, the correction coefficient De corresponding to 'the speed No of the engine 34 as of when the snow-removal working part 40 is turned ON with the auger switch 73 (the reference speed Nob)' is taken as an upper limit value. That is, the upper limit value of the correction coefficient De is determined at the timing at which the snow-removal working part 40 is turned ON with the auger switch 73. Consequently, in the low idle state the correction coefficient De is high in the first place, at 1.0. Even if the speed No falls somewhat in correspondence with the size of the load, the correction coefficient De can be kept at a high value. Because of this, when work is started in the low idle state, the speed of the electric motors 33L, 33R can to some extent be maintained. Therefore, the machine can be shifted swiftly from the low idle state to an optimal working state, and as a result it is possible to improve the operability of the snow-remover 10.

Furthermore, because the frequency of adjusting the throttle aperture with the engine throttle lever 76 because the load has fluctuated can be reduced, operating the snow-remover 10 becomes simple. Also, because it is not necessary to set the throttle aperture high at all times in order to cut down throttle control operations, fuel consumption can be reduced and it is possible to have consideration for the working environment.

When the speed No falls further, this is dealt with by adjusting the throttle aperture.

Also, because the operator can suitably determine (1) the setting of the throttle aperture and (2) the timing at which the snow-removal working part 40 is turned ON with the auger switch 73. By this means, the speed No of the engine 34 as of when the snow-removal working part 40 is turned ON with the auger switch 73 (the reference speed Nob) can be set freely. Consequently, it is possible to run the snow-remover 10 in a more optimal state.

Also, because the control part 56 is provided in advance with a plurality of correction coefficient maps 101 to 103 having different correction coefficient De characteristics, and the correction coefficient determining means 112 is constructed to select one of the correction coefficient maps 101 to 103 in correspondence with the speed No of the engine 34 as of when the snow-removal working part 40 was turned on, the speed of the electric motors 33L, 33R can be controlled more finely and optimally.

In this invention, in the preferred embodiment, a snow-remover 10 was shown as a working machine; however, the invention is not limited to a snow-remover, and may be applied to a working machine of some other type, such as a mower or a cultivator. In the case of a mower the working part is a grass cutter driven by the engine, and in the case of a cultivator the working part is a tilling claw.

The transporting part may alternatively be for example a crawler instead of wheels.

Also, the number of correction coefficient maps having different correction coefficient De characteristics is not limited, and the more there are the more finely the speed control can be executed and so the better.

Also, in FIG. 9 to FIG. 11 and FIG. 13 the maps were shown schematically to facilitate understanding, and the form of the maps is not limited to these examples and can be set freely. And, the correction coefficients expressed in the maps may alternatively be obtained by computation.

As described above, a working machine according to this invention is particularly suitable as a snow-remover, a mower or a cultivator or the like wherein a generator is also driven by an engine driving a working part and a transporting part is driven by an electric motor having the generator and a battery as its drive source.

Obviously, various minor changes and modifications of the present invention are possible in the light of the above teaching. It is therefore to be understood that within the scope of the appended claims the invention may be practiced otherwise than as specifically described.

What is claimed is:

1. A working machine comprising:
   a driving part comprised of an engine, a battery, a generator driven by the engine for supplying electrical power to the battery to charge the battery, and an electric motor driven by the generator and the battery;
   a working part driven by the engine for performing a predetermined work operation;
   a work ON/OFF switch for switching between a working state and a non-operating state of the working part;
   a transporting part driven by the electric motor; and
   a control part for controlling rotation of the electric motor in accordance with a comparison of an actual travel speed of the transporting part and a target travel speed of the transporting part, the control part comprising reference speed setting means for setting the speed of the engine to a reference speed at a time at which the working part is placed in the working state when the ON/OFF switch is switched ON, correction coefficient determining means for determining a correction coefficient corresponding to a present speed of the engine from a correction characteristic having a correction coefficient corresponding to the reference speed as an upper limit value and approaching zero as the speed of the engine decreases, required acceleration determining means for determining a required acceleration of the transporting part in accordance with the actual travel speed of the transporting part, means for obtaining a corrected required acceleration by multiplying the required acceleration by the correction coefficient determined by the correction coefficient determining means, and means for accelerating the speed of the electric motor in accordance with the obtained corrected required acceleration.

2. A working machine according to claim 1; wherein the control part further comprises a storage device for storing a plurality of correction coefficient maps having different correction coefficient characteristics and means for selecting one correction coefficient map from among the plurality of correction coefficient maps, when the correction coefficient determining means determines the correction coefficient, in accordance with the speed of the engine at the time in which the working part is placed in the working state.

3. A working machine according to claim 1; wherein the working part comprises an auger.

4. A working machine according to claim 1; wherein the working machine comprises a snow-removing machine; and wherein the working part comprises an auger for removing snow during operation of the snow-removing machine.

5. A working machine according to claim 1; wherein the working machine comprises a self-propelled, walking-behind working machine.

6. A working machine according to claim 2; wherein the storage device for storing the plurality of correction coefficient maps comprises a memory built in the control part.

7. A working machine comprising: a machine body; an engine mounted on the machine body; at least one electric motor mounted on the machine body; a working part driven by the engine during a working state of the working part for performing a working operation; at least one transporting part driven by the electric motor for transporting the working machine during the working operation; reference speed setting means for setting a speed of the engine as a reference speed at a time at which the working state of the working part is initiated; first determining means for determining a correction coefficient corresponding to a present speed of the engine from a correction characteristic having a correction coefficient corresponding to the reference speed of the engine; second determining means for determining an acceleration of the transporting part in accordance with an actual travel speed of the transporting part; means for obtaining a corrected acceleration by multiplying the acceleration determined by the second determining means by the correction coefficient determined by the first determining means; and means for accelerating the speed of the electric motor in accordance with the obtained corrected acceleration.

8. A working machine according to claim 7; wherein the machine body comprises a transport frame for supporting the transporting part and a transmission case pivotally connected to the transport frame for supporting the electric motor and the engine.

9. A working machine according to claim 7; wherein the at least one transporting part comprises a pair of transporting parts comprised of crawlers.

10. A working machine according to claim 7; further comprising a storage device for storing a plurality of coefficient maps having different correction coefficient characteristics, and means for selecting one correction coefficient map from among the plurality of correction coefficient maps when the correction coefficient determining means determines the correction coefficient.

11. A working machine according to claim 10; wherein the storage device for storing the plurality of correction coefficient maps comprises a built-in memory.

12. A working machine according to claim 7; wherein the working part comprises an auger.

13. A working machine according to claim 7; wherein the working machine comprises a snow-removing machine; and wherein the working part comprises an auger for removing snow during operation of the snow-removing machine.

14. A working machine according to claim 7; wherein the working machine comprises a self-propelled, walking-behind working machine.

15. A working machine comprising: an engine; a battery; an electric motor driven by the battery; a generator for generating electrical power to charge the battery; a working part driven by the engine during a working state of the working part for performing a working operation; a transporting part driven by the electric motor for transporting the working machine during the working operation; and control means for controlling rotation of the electric motor by setting a speed of the engine as a reference speed at a time at which the working state of the working part is initiated, determining a correction coefficient corresponding to a present speed of the engine from a correction characteristic having a correction coefficient corresponding to the reference speed of the engine, determining an acceleration of the transporting part in accordance with an actual travel speed of the transporting part, obtaining a corrected acceleration by multiplying the acceleration determined by the second determining means by the correction coefficient determined by the first determining means, and accelerating the speed of the electric motor in accordance with the obtained corrected acceleration.

16. A working machine according to claim 15; wherein the control means includes storage means for storing a plurality of coefficient maps having different correction coefficient characteristics, and means for selecting one correction coefficient map from among the plurality of correction coefficient maps when the correction coefficient determining means determines the correction coefficient.

17. A working machine according to claim 15; wherein the working machine comprises a snow-removing machine; and wherein the working part comprises an auger for removing snow during operation of the snow-removing machine.

18. A working machine according to claim 15; wherein the working machine comprises a self-propelled, walking-behind working machine.

* * * * *